(12) United States Patent
Vasyltsov et al.

(10) Patent No.: US 8,874,632 B2
(45) Date of Patent: Oct. 28, 2014

(54) APPARATUS FOR GENERATING RANDOM NUMBER

(75) Inventors: Ihor Vasyltsov, Suwon-Si (KR); Karpinskyy Bohdan, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 400 days.

(21) Appl. No.: 13/413,159

(22) Filed: Mar. 6, 2012

(65) Prior Publication Data

US 2012/0233231 A1 Sep. 13, 2012

(30) Foreign Application Priority Data

Mar. 7, 2011 (KR) .................. 10-2011-0019889

(51) Int. Cl.
*G06F 7/58* (2006.01)

(52) U.S. Cl.
CPC .................................. *G06F 7/588* (2013.01)
USPC ........................................................ 708/255

(58) Field of Classification Search
None
See application file for complete search history.

(56) References Cited

U.S. PATENT DOCUMENTS

| 5,966,313 | A | 10/1999 | Sakamoto | |
|---|---|---|---|---|
| 6,687,721 | B1 | 2/2004 | Wells et al. | |
| 8,443,022 | B2* | 5/2013 | Vasyltsov et al. | 708/250 |
| 8,527,567 | B2* | 9/2013 | Vasyltsov et al. | 708/250 |
| 2010/0201419 | A1* | 8/2010 | Vasyltsov et al. | 327/164 |
| 2011/0302232 | A1* | 12/2011 | Vasyltsov et al. | 708/251 |
| 2012/0233231 | A1* | 9/2012 | Vasyltsov et al. | 708/250 |
| 2012/0233233 | A1* | 9/2012 | Chandra | 708/251 |

FOREIGN PATENT DOCUMENTS

| JP | 2003-131867 | 5/2003 |
|---|---|---|
| JP | 2008-176698 | 7/2008 |

* cited by examiner

*Primary Examiner* — David H Malzahn
(74) *Attorney, Agent, or Firm* — Onello & Mello, LLP

(57) ABSTRACT

An apparatus configured to generate random numbers is provided, the apparatus having high entropy and being capable of a reduced chip size. The apparatus includes a plurality of metastable state generation units configured to generate a metastable state signal, a plurality of amplification units configured to amplify the metastable state signal, a connection signal generation unit configured to generate a first connection signal, and a first commutation unit configured to connect at least one metastable state generation unit to at least one amplification unit according to the first connection signal. For example, the number of metastable state generation units and amplification units necessary to achieve are threshold number of commutation connections can be greatly reduced as compared to conventional apparatuses for generating random numbers.

14 Claims, 18 Drawing Sheets

APPARATUS FOR GENERATING RANDOM NUMBER

CROSS-REFERENCE TO RELATED APPLICATIONS

This application claims the benefit of Korean Patent Application No. 10-2011-0019889, filed on Mar. 7, 2011, in the Korean Intellectual Property Office, the disclosure of which is incorporated herein in its entirety by reference.

BACKGROUND

The inventive concept relates to an apparatus for generating a random number, and more particularly, to an apparatus for generating a random number by generating a metastable state signal using logic gates.

Metastability is widely used in a true random number generator (TRNG) since it is known to have good stochastic properties. A TRNG, for example, can take the form of a module added to a computer for the purpose of generating true (or truly) random numbers. Conventionally, to use metastability, a latch or a flip-flop has been mainly used. However, due to various factors, such as mismatches between transistors, temperature imbalance inside a chip, ionizing radiation, or parasitic fluctuation of output voltages, the probability that a physical flip-flop circuit will stay in a metastable region is very low. Natural metastability rarely occurs and, thus, it is inefficient to use the metastable phenomenon of the flip-flop circuit as a basis for a reliable TRNG. That is, the natural occurrence of metastability is very rare, thus causing a reduction in the value of either accumulated entropy or TRNG throughput.

SUMMARY

In accordance with various aspects of the inventive concept, provided is an apparatus for generating a random number having high entropy and capable of reducing a chip size.

According to an aspect of the inventive concept, there is provided a random number generating apparatus, the apparatus including a plurality of metastable state generation units configured to generate a metastable state signal; a plurality of amplification units configured to amplify the metastable state signal; a connection signal generation unit configured to generate a first connection signal; and a first commutation unit configured to connect at least one metastable state generation unit to at least one amplification unit according to the first connection signal. The first commutation unit is configured to connect a metastable generation unit to a different one of the plurality of amplification units based on the first connection signal.

The first commutation unit may include a plurality of switches, each switch configured to provide a connection commutation between at least one metastable state generation unit and at least one amplification unit.

If the number of the plurality of metastable state generation units is m and the number of the plurality of amplification units is n, the plurality of switches may be configured to provide m×n connection commutations.

The apparatus may further include a decoder configured to provide an operation signal to the plurality of switches according to the first connection signal.

The first commutation unit may include at least one multiplexer connected to the plurality of metastable state generation units and configured to transmit the metastable state signal, and at least one demultiplexer connected between the multiplexer and the plurality of amplification units and configured to transmit the metastable state signal. The multiplexer and the demultiplexer may operate by receiving the first connection signal.

The apparatus may further include an entropy estimator configured to estimate entropy of the amplified metastable state signal.

The entropy estimator may be configured to estimate the entropy of the amplified metastable state signal using at least one of a bias test method and a chi-squared test method.

The entropy estimator may be configured to transmit a plurality of entropies corresponding to connection commutations of one or more metastable state generation units and one or more amplification units, and the connection signal generation unit may be configured to generate the first connection signal based on the plurality of entropies transmitted by the entropy estimator.

The entropy estimator may be configured to transmit a plurality of entropies corresponding to all connection commutations to the connection signal generation unit. And the connection signal generation unit may be configured to generate the first connection signal corresponding to a connection commutation having maximum entropy from among the plurality of entropies.

If entropy corresponding to one connection commutation is greater than a threshold value, the entropy estimator may be configured to stop estimating and transmitting entropy corresponding to another connection commutation to the connection signal generation unit, and the connection signal generation unit may be configured to generate the first connection signal corresponding to the connection commutation having entropy greater than the threshold value.

The connection signal generation unit may include a storage element configured to store data used to generate the first connection signal.

In the above case, during an electronic die sort (EDS) test on the apparatus, one or more entropies corresponding to connection commutations of one or more of the metastable state generation units and one or more of the amplification units may be estimated. And the data may be programmed in the storage to generate a connection signal corresponding to a connection commutation having maximum entropy or having entropy greater than the threshold value from among the one or more entropies.

The apparatus may further include a second commutation unit connected to the plurality of amplification units and configured to generate a random signal from the amplified metastable state signal.

The second commutation unit may comprise an XOR gate.

According to another aspect of the inventive concept, there is provided a random number generating apparatus, the apparatus including a plurality of metastable state generation units configured to generate a metastable state signal; a plurality of amplification units configured to amplify the metastable state signal; a sampling unit for storing the amplified metastable state signal and outputting the amplified metastable state signal in response to a clock signal; a first commutation unit configured to connect at least one metastable state generation unit to at least one amplification unit according to a first connection signal; a second commutation unit configured to connect the at least one amplification unit to the sampling unit according to a second connection signal; and a connection signal generation unit configured to generate the first and second connection signals.

The first commutation unit may be configured to connect a metastable generation unit to a different one of the plurality of amplification units based on the first connection signal.

According to another aspect of the inventive concept, provided is a method of generating random numbers. The method comprises generating a metastable state signal from a plurality of metastable state generation units, generating a first connection signal from a connection signal generation unit, and selectively connecting, using a first commutation unit, at least one of the metastable state generation units to at least one amplification unit from a plurality of amplification units based on the first connection signal. The first commutation unit is configured to connect a metastable generation unit to a different one of the plurality of amplification units based on the first connection signal.

The first commutation unit may include a plurality of switches, and the method further include providing a connection commutation between at least one metastable state generation unit and at least one amplification unit using one or more of the plurality of switches.

The method may further include providing a number m of the plurality of metastable state generation units, providing a number n of the plurality of amplification units; and providing m×n connection commutations using the plurality of switches.

The method may further include generating a random signal from the amplified metastable state signal by a second commutation unit connected to the plurality of amplification units.

BRIEF DESCRIPTION OF THE DRAWINGS

Aspects of the inventive concept will be more clearly understood from the following detailed description taken in conjunction with the accompanying drawings briefly described below, which depict example embodiments in accordance therewith. In the drawings.

DETAILED DESCRIPTION OF THE EMBODIMENTS

Figure 1:
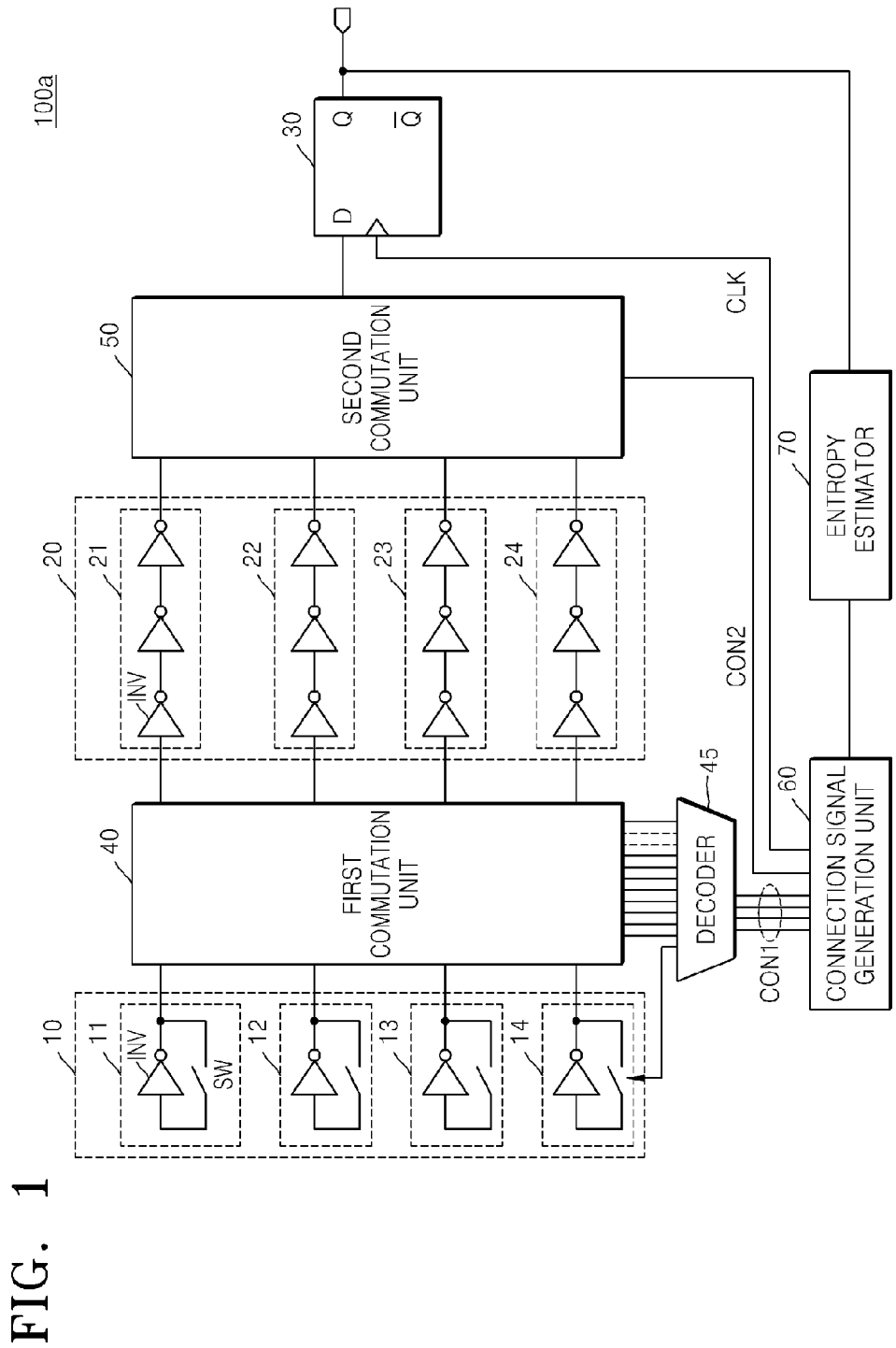
FIG. 1 is a block diagram of an embodiment of an apparatus configured to generate a random number, according to aspects of the inventive concept.

Hereinafter, aspects of the inventive concept will be described with reference to the accompanying drawings, in which example embodiments are shown. The inventive concept may, however, be embodied in many different forms and should not be construed as being limited to the embodiments set forth herein. It should be understood that the shapes of elements illustrated in the drawings are exemplarily provided for clarity and illustration and may be variously changed. Like reference numerals denote like elements in the drawings.

The terminology used herein is for the purpose of describing particular embodiments and is not intended to limiting the inventive concept. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" refers to one of or a combination of at least two of listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Embodiments of the inventive concept are described herein with reference to schematic illustrations of idealized embodiments (and intermediate structures) of the inventive concept. As such, variations from the shapes of the illustrations as a result, for example, of manufacturing techniques and/or tolerances, are to be expected. Thus, the embodiments of the inventive concept should not be construed as limited to the particular shapes of regions illustrated herein, but are to include deviations in shapes that result, for example, from manufacturing.

FIG. 1 is a block diagram of an embodiment of an apparatus 100a configured to generate a random number, according to an embodiment of the inventive concept.

Referring to FIG. 1, the random number generating apparatus 100a may include metastable state generation units 10 (first through fourth metastable state generation units 11 through 14), amplification units 20 (first through fourth amplification units 21 through 24), a sampling unit 30, a first commutation unit 40, a second commutation unit 50, a connection signal generation unit 60, and an entropy estimator 70.

The metastable state generation units 10 may generate and output a metastable state signal. For example, each of the metastable state generation units 11-14 may include an inversion unit INV that inverts an input signal and outputs the inverted input signal. The inversion unit INV may be, for example, an inverter of which input and output terminals are connected to each other. In this case, a switch SW may be connected between the input and output terminals of the inversion unit INV. The switch SW may be turned on or off in response to an operation signal (not shown).

If the switch SW is turned on, the input and output terminals of the inversion unit INV are connected to each other, and thus the metastable state signal may be output. For example, the inversion unit INV may be an inverter, and input and output terminals of the inverter may be connected in the form of a loop that includes the switch SW. In this case, an output voltage of the inverter converges to a metastable level, and then is maintained constantly. Due to thermal noise, the output voltage of the inverter stochastically fluctuates in the metastable level.

The amplification units 20 may be configured to receive the metastable state signal output from the metastable state generation units 10, to amplify the metastable state signal, and to output the amplified metastable state signal. Each of the amplification units 20 may include one or more inversion units INV (e.g., inverters) connected in series. The metastable state signal input to the amplification units 20 may be amplified to a level samplable by the sampling unit 30, while passing through the inversion units INV. For example, the inversion units INV may be circuit elements produced in the same chip level manufacturing process.

The sampling unit 30 may be configured to store the amplified metastable state signal, and to sample and output the amplified metastable state signal in response to a sampling clock signal. The output signal of the sampling unit 30 has a value obtained by sampling the amplified metastable state signal according to a sampling clock, and has properties of a "true" (or truly) random number. Although a D flip-flop is illustrated as an example of the sampling unit 30 in FIG. 1, the current embodiment is not limited thereto and the D flip-flop may be substituted with or replaced by any other elements for performing a sampling function that are known in the art.

The first commutation unit 40 may be configured to connect at least one of metastable state generation units 10 to at least one of the amplification units 20, according to a first connection signal CON1. Also, the second commutation unit 50 may be configured to connect the at least one of the amplification units 20 to the sampling unit 30, according to a second connection signal CON2. Although not shown in FIG. 1, the first commutation unit 40 may include a plurality of switches.

The decoder 45 may be configured to provide an operation signal to the switches within the first communication unit 40 in response to the first connection signal CON1. Although the decoder 45 is separate from the first commutation unit 40 in FIG. 1, the decoder 45 and first communication unit may be combined. For example, the decoder 45 may be included in the first commutation unit 40. Also, an operation signal of the switches SW for operating the metastable state generation units 10 is output from the decoder 45 in FIG. 1, wherein the operation signal may be directly output from the connection signal generation unit 60 and applied to the switches SW.

The connection signal generation unit 60 may be configured to generate the first and second connection signals CON1 and CON2. If at least one of the amplification units 20 is connected to at least one of the metastable state generation units 10 according to the first connection signal CON1, the at least one amplification unit 20 may be connected to the sampling unit 30 according to the second connection signal CON2. The at least one of the metastable state generation units 10 (e.g., the second metastable state generation unit 12), the at least one of the amplification units 20 (e.g., the first amplification unit 21), and the sampling unit 30, which are connected to each other according to the first and second connection signals CON1 and CON2 generated by the connection signal generation unit 60, may operate as one random number generator.

The entropy estimator 70 may be configured to estimate entropy of the amplified metastable state signal. For example, the entropy estimator 70 may be configured to estimate the entropy of the amplified metastable state signal by using at least one of a bias test method and a chi-squared test method. The entropy estimator 70 may be configured to transmit a plurality of entropies, or entropy signals, corresponding to connection commutations of one or more metastable state generation units 10 and one or more amplification units 20, to the connection signal generation unit 60.

The connection signal generation unit 60 may be configured to generate the first connection signal CON1 based on the entropies transmitted from the entropy estimator 70. For example, if power is supplied to the random number generating apparatus 100a, during an initialization operation, the connection signal generation unit 60 may generate a temporary connection signal according to a connection commutation. According to the temporary connection signal, at least one metastable state generation unit 10, at least one amplification unit 20, and the sampling unit 30 may be connected to each other, and may operate as one random number generator.

Figure 2:
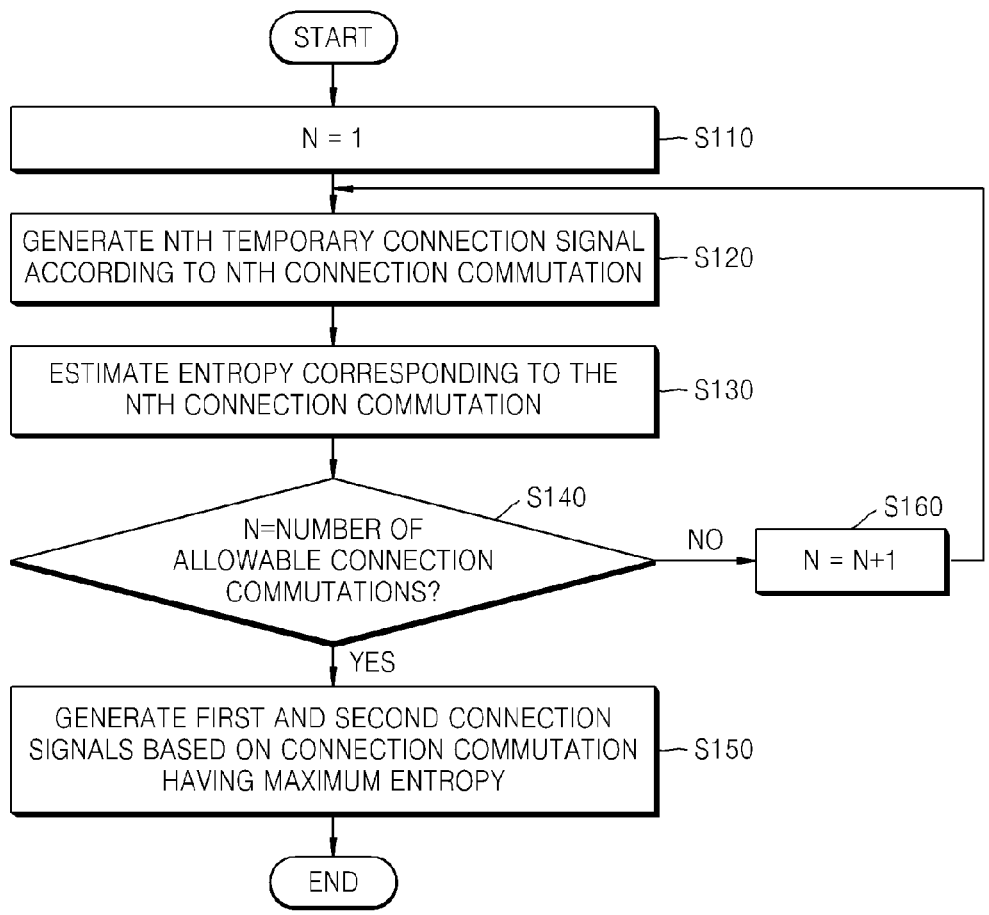
FIG. 2 is a is a flowchart of an embodiment of a method of generating first and second connection signals, e.g., performed by the connection signal generation unit of the random number generating apparatus illustrated in FIG. 1, according to aspects of the inventive concept.

FIG. 2 is a flowchart of an embodiment of a method of generating the first and second connection signals CON1 and CON2, which can be performed by the connection signal generation unit 60 of the random number generating apparatus 100a illustrated in FIG. 1, according to aspects of the inventive concept.

Referring to FIG. 2, initially, a constant N is set as 1 (N=1) in operation S110. Then, the connection signal generation unit 60 generates an $n^{th}$ temporary connection signal according to an $N^{th}$ connection commutation in operation S120. Then, the entropy estimator 70 estimates entropy corresponding to the $N^{th}$ connection commutation in operation S130. Then, it is determined whether N is the number of allowable connection commutations in operation S140.

In operation S140, if N is the number of allowable connection commutations (i.e., if entropies of all allowable connection commutations have been estimated), the connection signal generation unit 60 generates the first and second connection signals CON1 and CON2 based on a connection commutation having maximum entropy from among the estimated entropies, in operation S150. But in operation S140, ff N is less than the number of allowable connection commutations (i.e., if entropies of all allowable connection commutations have not been completely estimated), N is increased by 1 in operation S160, and the above-described operations S120 and S130 are repeated to estimate entropies of other connection commutations.

For example, the connection signal generation unit 60 may generate a first temporary connection signal according to a first connection commutation for connecting the first metastable state generation unit 11 to the first amplification unit 21. Then, the entropy estimator 70 may estimate and transmit first entropy corresponding to the first connection commutation, to the connection signal generation unit 60.

Since N satisfies N=1 and is less than the number of allowable connection commutations (e.g., the number of allowable connection commutations is 16 if the number of the metastable state generation units 10 is 4 and the number of the amplification units 20 is 4), N is increased by 1 (N=N+1=2). Then, the connection signal generation unit 60 may generate a second temporary connection signal according to a second connection commutation for connecting the first metastable state generation unit 11 to the second amplification unit 22, and the entropy estimator 70 may estimate and transmit second entropy corresponding to the second connection commutation, to the connection signal generation unit 60. In this embodiment, with 4 metastable state generation units 10 and 4 amplification units 20, there are up to 16 entropy commutations, i.e., 4×4=16.

In this manner, first through sixteenth entropies may be estimated, and the connection signal generation unit 60 may generate the first and second connection signals CON1 and CON2 based on a connection commutation having maximum entropy from among the first through sixteenth entropies. For example, if the second entropy has a maximum value, the connection signal generation unit 60 may generate the first connection signal CON1 for connecting the first metastable state generation unit 11 to the second amplification unit 22, and the second connection signal CON2 for connecting the second amplification unit 22 to the sampling unit 30.

Figure 3:
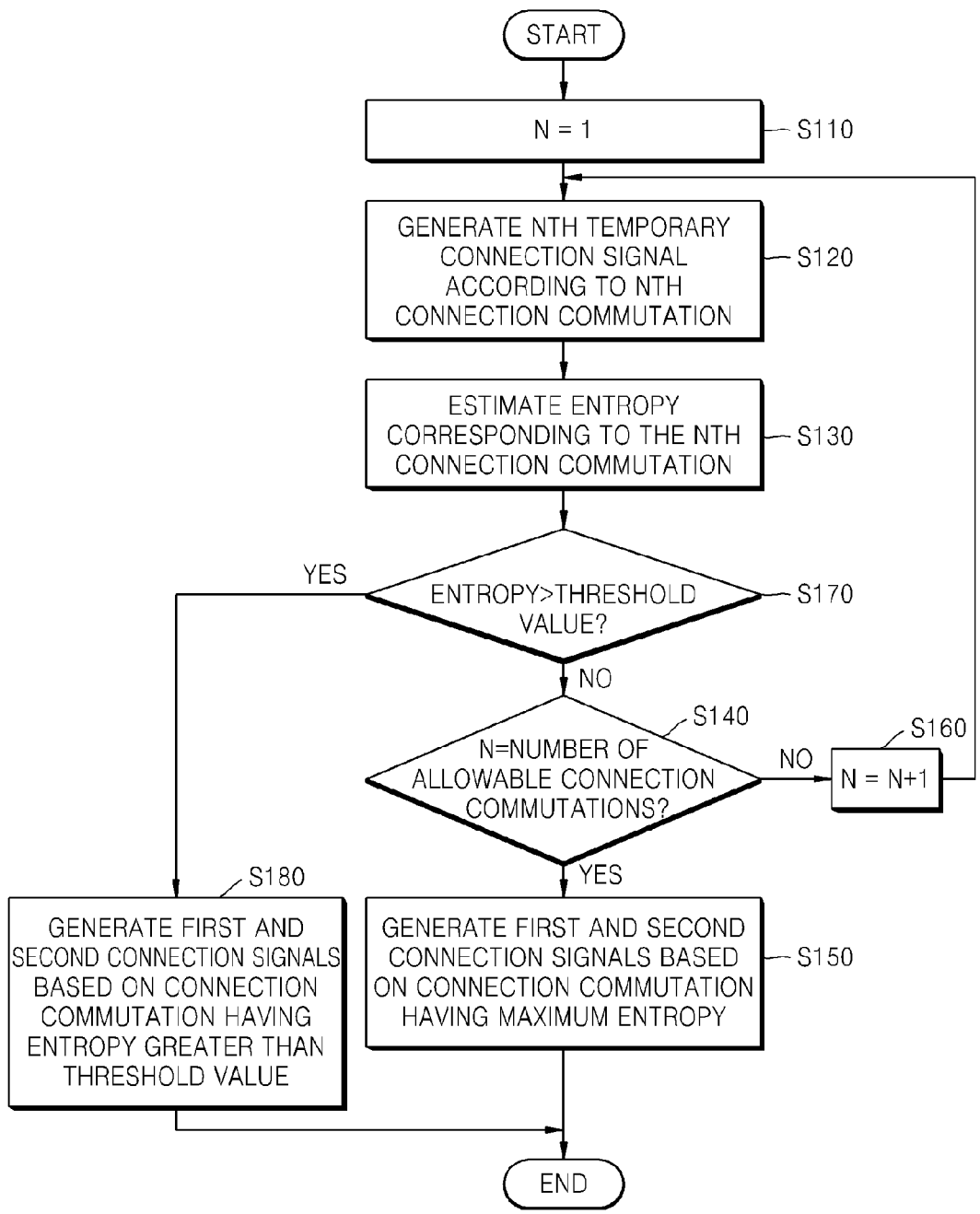
FIG. 3 is a is a flowchart of another embodiment of a method of generating the first and second connection signals, e.g., performed by the connection signal generation unit of the random number generating apparatus illustrated in FIG. 1, according to aspects of the inventive concept.

FIG. 3 is a is a flowchart of another embodiment of a method of generating the first and second connection signals CON1 and CON2, which can be performed by the connection signal generation unit 60 of the random number generating apparatus 100a illustrated in FIG. 1, according to aspects of the inventive concept. The method illustrated in FIG. 3 may be considered to be a partially modified form of the method illustrated in FIG. 2. Thus, repeated descriptions therebetween are not provided here.

Referring to FIG. 3, entropy corresponding to an $N^{th}$ connection commutation is estimated in operation S130, as in FIG. 2. It is then determined whether the estimated entropy is greater than a threshold value in operation S170. If, in operation S170, the entropy is greater than the threshold value, the connection signal generation unit 60 generates the first and second connection signals CON1 and CON2 based on a connection commutation corresponding to the entropy greater than the threshold value, in operation S180. That is, if entropy corresponding to one connection commutation is greater than the threshold value, the entropy estimator 70 may stop estimating and transmitting an entropy corresponding to another connection commutation to the connection signal generation unit 60. Accordingly, an optimal solution (i.e., a connection relationship) for generating the first and second connection signals CON1 and CON2 may be obtained even when entropies of all connection commutations are not completely estimated, and a time taken to perform an initialization operation may be reduced.

If, in operation S170, the entropy corresponding to the $N^{th}$ connection commutation is not greater than the threshold value, the method continues to operation S140 to determine of the number of allowable connection commutations has been reached, as in FIG. 2. If not, N=N+1 in operation S160, and an entropy corresponding to another connection commutation is estimated in operation S130, also as in FIG. 2, and it is determined whether the entropy is greater than the threshold value in operation S170. If the above operations are repeated and entropies of all possible connection commutations are estimated (i.e., all of the entropies are not greater than the threshold value), the connection signal generation unit 60 generates the first and second connection signals CON1 and CON2 based on a connection commutation having maximum entropy from among the estimated entropies, in operation S150.

Figure 4:
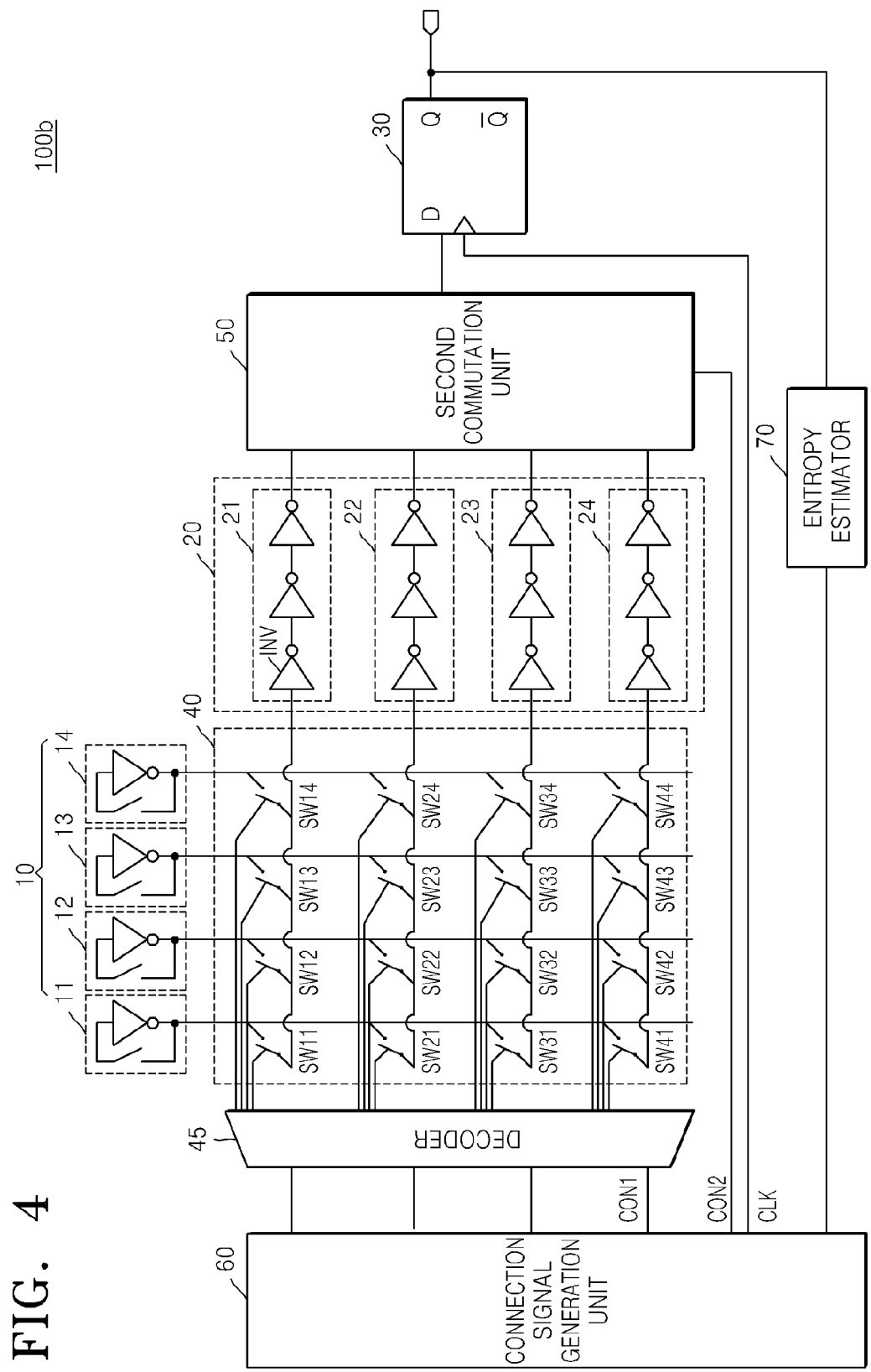
FIG. 4 is a circuit diagram of another embodiment of an apparatus configured to generate a random number, according to aspects of the inventive concept.

FIG. 4 is a circuit diagram of another embodiment of an apparatus 100b for generating a random number according to aspects of the inventive concept. The random number generating apparatus 100b illustrated in FIG. 4 may be considered to be a partially modified form of the random number generating apparatus 100a illustrated in FIG. 1. Thus, repeated descriptions therebetween are not provided here.

The first commutation unit 40 may include a plurality of switches. Each of the switches may be configured to provide a connection commutation between at least one of the metastable state generation units 10 and at least one of the amplification units 20. For example, if the number of the metastable state generation units 10 is m and the number of the amplification units 20 is n, the switches may be configured to provide m×n connection commutations.

Referring to FIG. 4, if the number of the metastable state generation units 10 is 4 and the number of the amplification units 20 is 4, the first commutation unit 40 may include 16 switches SW11 through SW14, SW21 through SW24, SW31 through SW34, and SW41 through SW44 for providing 16 connection commutations between the four metastable state generation units 10 and the four amplification units 20. Also, the first commutation unit 40 may further include the decoder 45 configured to provide an operation signal to the switches SW11 through SW14, SW21 through SW24, SW31 through SW34, and SW41 through SW44 according to the first connection signal CON1.

Although the metastable state generation units 10 are 1:1 connected to the amplification units 20 based on the first connection signal CON1 in FIG. 4, the current embodiment is not limited thereto. For example, it would be easily understood by one of ordinary skill in the art that the metastable state generation units 10 can be 1:n or n:1 connected to the amplification units 20 based on the first connection signal CON1, where n≥1.

The second commutation unit 50 may include at least one multiplexer (e.g., see FIG. 13) connected between the amplification units 20 and the sampling unit 30. The multiplexer may be configured to transmit the metastable state signal amplified by the amplification units 20 to the sampling unit 30 according to the second connection signal CON2.

Figure 5:
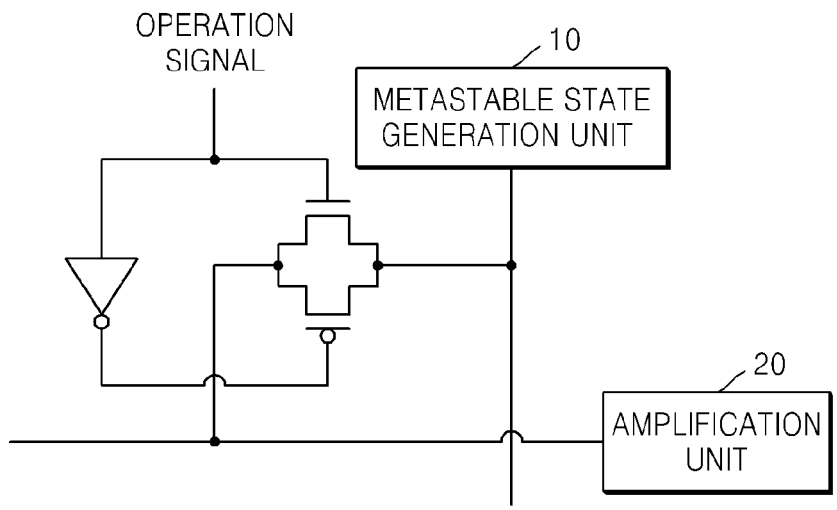
FIGS. 5 through 7 are detailed circuit diagrams of embodiments of a switch, such as that illustrated in FIG. 4, according to aspects of the inventive concept.
Figure 6:
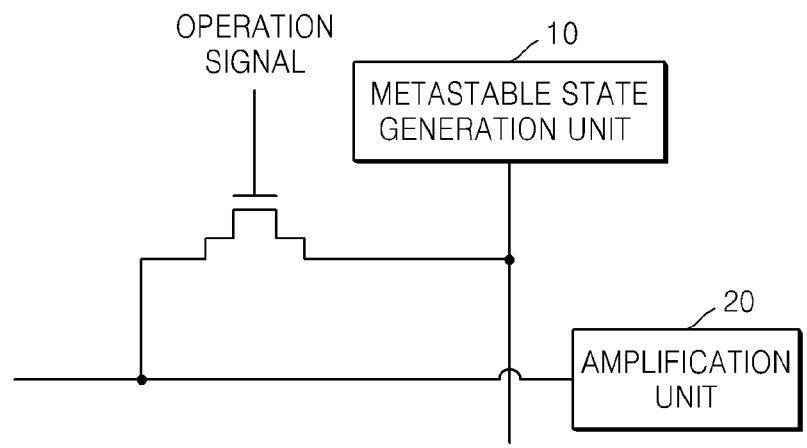
Figure 7:
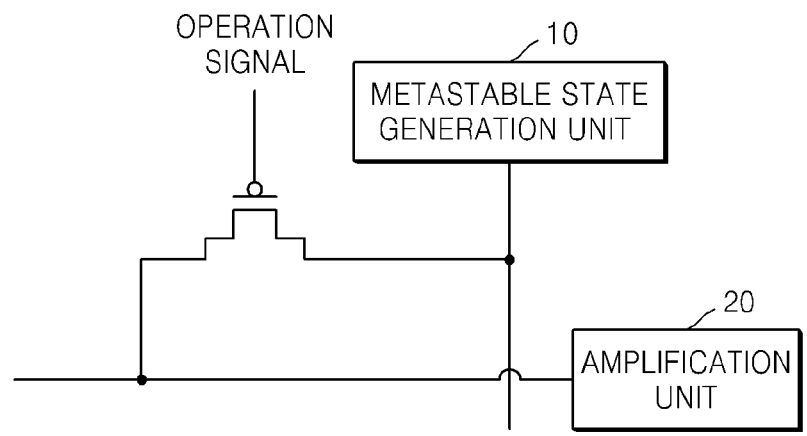

FIGS. 5 through 7 are detailed circuit diagrams of embodiments of a switch that can be used in the apparatus illustrated in FIG. 4.

Referring to FIGS. 5 through 7, each of a plurality of switches (the switches SW11 through SW14, SW21 through SW24, SW31 through SW34, and SW41 through SW44 illustrated in FIG. 4) may be a p-channel metal-oxide semiconductor (PMOS) transistor, an n-channel metal-oxide semiconductor (NMOS) transistor, or a path-gate, as examples.

In a path-gate illustrated in FIG. 5, if an operation signal generated by a decoder is applied to a gate of an NMOS transistor, the NMOS transistor is turned on and, consequently, at least one of the metastable state generation units (e.g., metastable state generation unit 11) and at least one of the amplification units (e.g., amplification unit 21) connected to both ends of the NMOS transistor are electrically connected to each other. Meanwhile, the operation signal is inverted by an inverter and is applied to a gate of the PMOS transistor. In this case, the PMOS transistor is turned on and the at least one metastable state generation unit (e.g., metastable state generation unit 11) and the at least one amplification unit (e.g., amplification unit 21) connected to both ends of the PMOS transistor are electrically connected to each other.

An NMOS switch illustrated in FIG. 6 and a PMOS switch illustrated in FIG. 7 may also electrically connect a metastable state generation unit and an amplification unit to each other on the same principle applied to the path-gate illustrated in FIG. 5.

Figure 8:
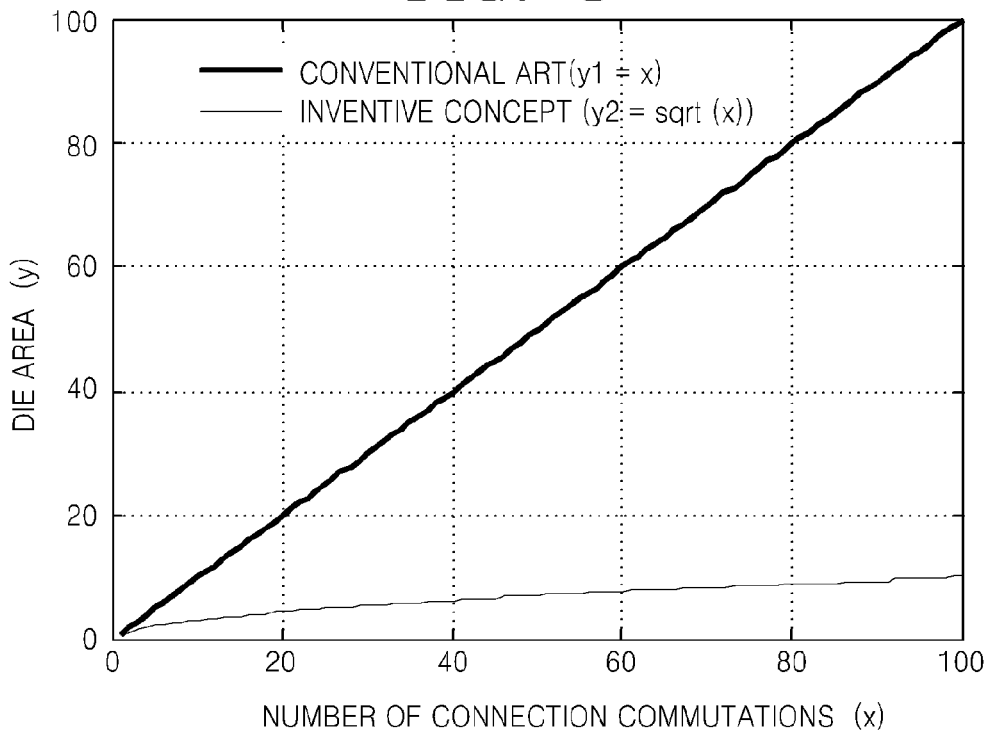
FIG. 8 is a graph showing an example of a die area of an apparatus for generating a random number according to a conventional art versus an example of a die area of an apparatus configured to generate a random number according to aspects of the inventive concept when the number of allowable connection commutations of random number generators are increased.

FIG. 8 is a graph showing an example of a die area of an apparatus for generating a random number according to a conventional art versus an example of a die area of an apparatus configured to generate a random number according to aspects of the inventive concept when the number of allowable connection commutations of random number generators (i.e., connection commutations of metastable state generation units and amplification units) are increased.

Referring to FIG. 8, in the conventional random number generating apparatus, in which a plurality of unit random number generators (i.e., structures in which metastable state generation units and amplification units are connected in series) are connected in parallel by using an XOR gate, additional unit random number generators are required to increase the number of connection commutations of the unit random number generators. Accordingly, if the number of connection commutations of the unit random number generators is increased, the die area of the random number generating apparatus is linearly increased in proportional to the number of connection commutations.

If a probability that unit random number generators produced in a certain process operate accurately (i.e., a yield rate) is 10% (0.1), an error rate of the unit random number generators is 0.9. Meanwhile, if x random number generators are used, as long as only one random number generator operates correctly, the random number generating apparatus may accurately generate a random number. Thus, if a probability that the random number generating apparatus operates accurately is $1-0.9\overset{\cdot}{0}x$ (or $1-0.9^x$) and a customer requests a yield rate of 96%, since $1-0.9\overset{\cdot}{0}$ x=0.96, where x>30 has to be satisfied. Therefore, thirty unit random number generators having thirty connection commutations are required. Accordingly, the number x of connection commutations is linearly proportional to a die area y1 (i.e., y1=x).

On the other hand, in embodiments of the random number generating apparatus according to aspects of the inventive concept, various connection commutations may be obtained by the first commutation unit 40 illustrated in FIG. 1 or 4. For example, thirty connection commutations may be obtained by using five metastable state generation units and six amplification units. Accordingly, a chip size may be greatly reduced.

The reduction in chip size is more clearly shown in the graph illustrated in FIG. 8. If the number of connection commutations is x and a die area is y, the random number generating apparatus according to a conventional art satisfies y=x (i.e., a linearly proportional correlation) and the random number generating apparatus according to aspects of the inventive concept satisfies y=sqrt(x) (i.e., y=the square root of x). In this case, when x=30, the die area y1 of the conventional random number generating apparatus satisfies the equation y1=x=30, e.g., has a die area y1=30 metastable state generation units x 30 amplification units. But a die area y2 of the random number generating apparatus according to the present inventive concept satisfies y2=sqrt(x)=sqrt(30)=5.5, e.g., has a die area y2=5.5 metastable state generation units x 5.5 amplification units. Therefore, the present inventive concept requires much less die area as compared to the conventional apparatus.

That is, in order to achieve a yield rate of 96%, the conventional random number generating apparatus requires thirty (30) metastable state generation units and thirty (30) amplification units but the random number generating apparatus according to an embodiment of the inventive concept can be accomplished with far fewer metastable state generation units and amplification units, having a product of at least 30, e.g., 5 metastable state generation units and 6 amplification units.

Figure 9:
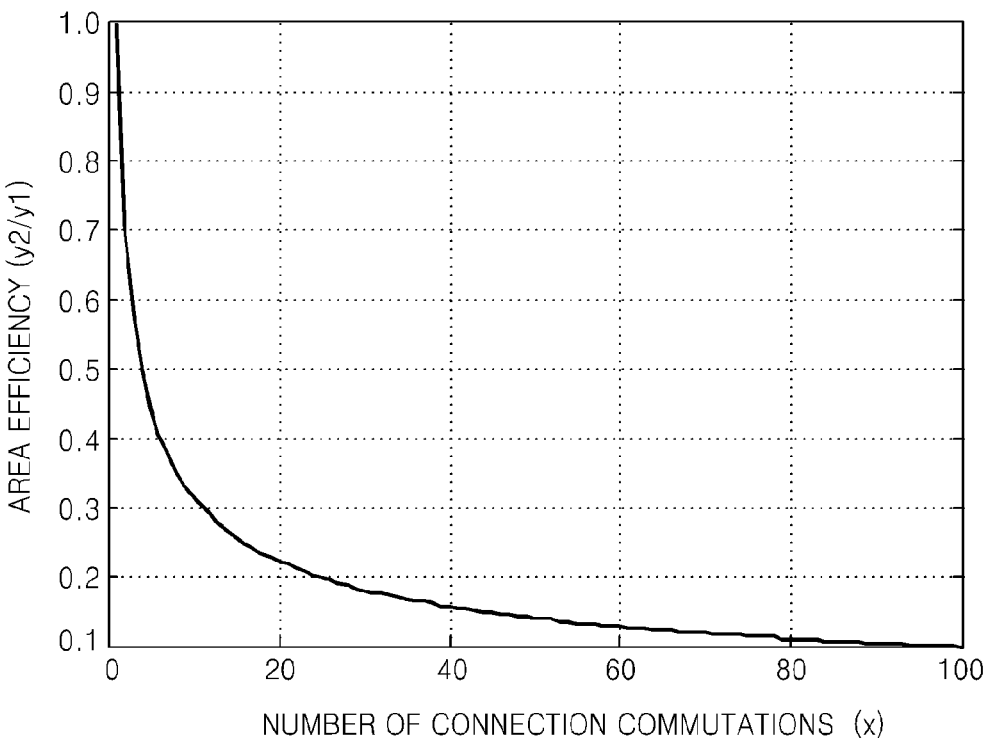
FIG. 9 is a graph showing an example of a ratio between an area of an apparatus for generating a random number according to a conventional art and an area of an apparatus configured to generate a random number according to aspects of the inventive concept.

FIG. 9 is a graph showing an example of a ratio between an area of an apparatus for generating a random number according to a conventional art and an area of an embodiment of an apparatus configured to generate a random number according to aspects of the inventive concept (i.e., area efficiency).

Referring to FIG. 9, the area efficiency satisfies the equation y2/y1=1/sqrt(x). Accordingly, if the number of required connection commutations is increased, the area of the random number generating apparatus according to aspects of the inventive concept compared to the area of the conventional random number generating apparatus is reduced and thus the area efficiency is increased.

Figure 10:
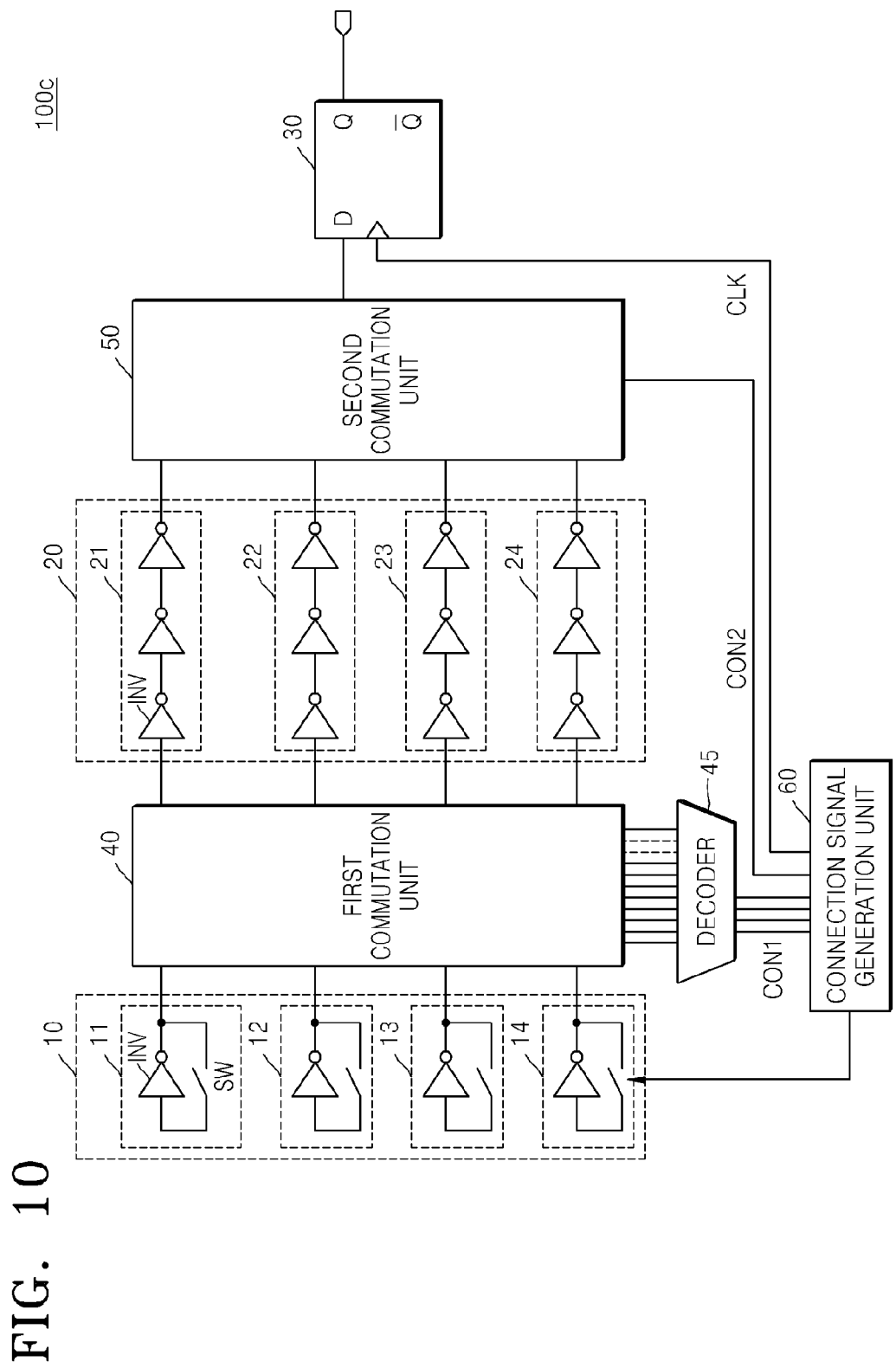
FIG. 10 is a circuit diagram of another embodiment of an apparatus configured to generate a random number, according to aspects of the inventive concept.

FIG. 10 is a circuit diagram of another embodiment of an apparatus 100c configured to generate a random number according to aspects of the inventive concept. The random number generating apparatus 100c illustrated in FIG. 10 may be considered to be a partially modified form the random number generating apparatus 100a illustrated in FIG. 1. Thus, repeated descriptions therebetween are not provided here.

Referring to FIG. 10, the entropy estimator 70 illustrated in FIG. 1 is not included in the random number generating apparatus 100c. In this case, firstly, the connection signal generation unit 60 may include a storage media (not shown) for storing data, e.g., a non-transitory storage device, component or element. Here, the data may be data used to generate the first and second connection signals CON1 and CON2 corresponding to a connection commutation having maximum entropy or having entropy greater than a threshold value. The above structure will be described in detail below with reference to FIG. 11.

Secondly, when the entropy estimator 70 is not included, the connection signal generation unit 60 may be configured to generate the first connection signal CON1 time-variably. That is, the first connection signal CON1 generated according to a connection signal is continuously variable, and thus a random number may be generated according to various connection commutations. The above structure will be described in detail below with reference to FIG. 18.

Figure 11:
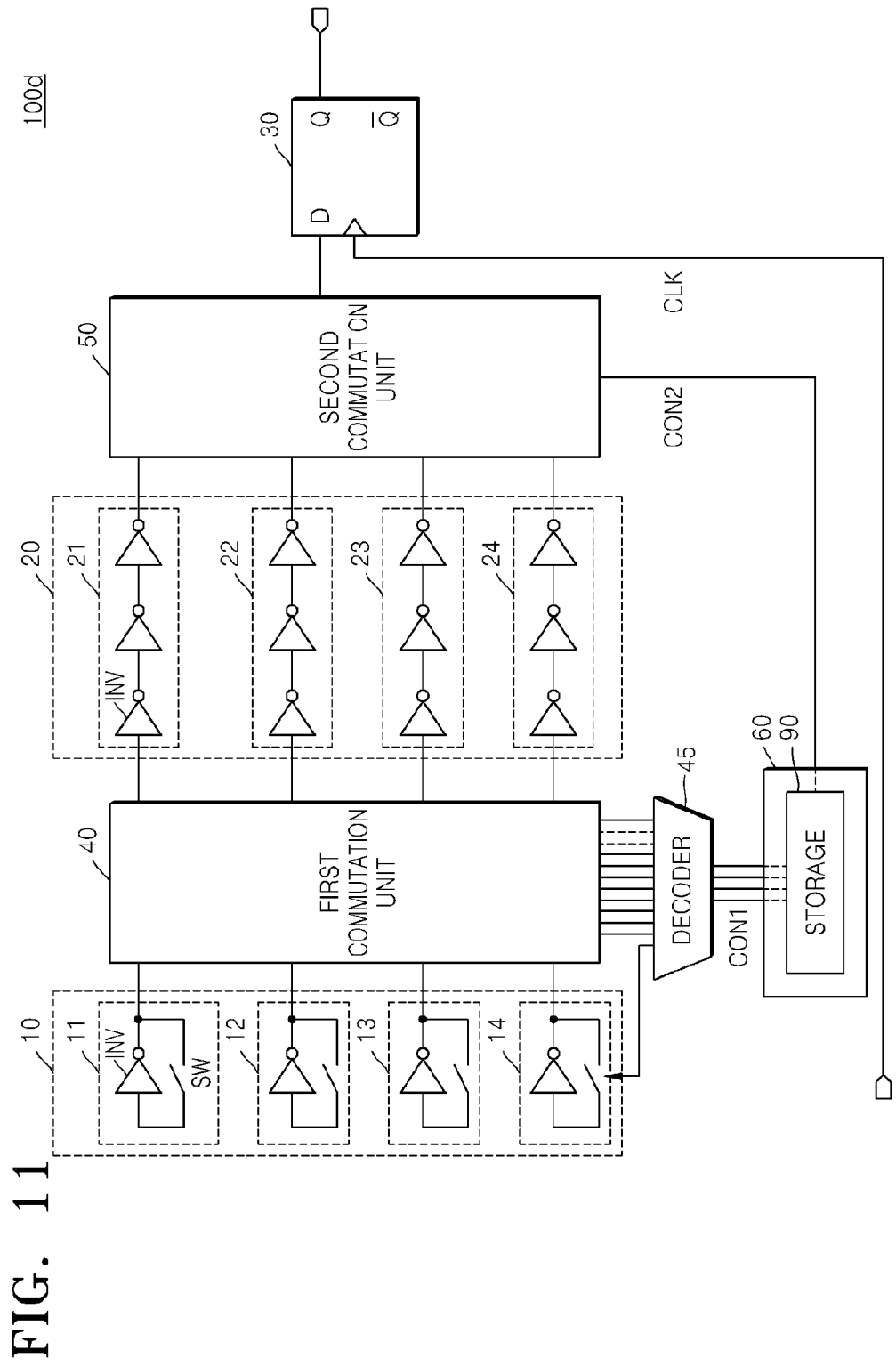
FIG. 11 is a circuit diagram of another embodiment of an apparatus configured to generate a random number, according to aspects of the inventive concept.

FIG. 11 is a circuit diagram of another embodiment of an apparatus 100d configured to generate a random number according to aspects of the inventive concept. The random number generating apparatus 100d illustrated in FIG. 11 may be considered to be a partially modified form of the random number generating apparatus 100c illustrated in FIG. 10. Thus, repeated descriptions therebetween are not provided here.

Referring to FIG. 11, the connection signal generation unit 60 may include a storage element 90 for storing data used to generate the first and second connection signals CON1 and CON2. That is, the connection signal generation unit 60 may generate the first and second connection signals CON1 and CON2 based on the data stored in the storage device 90. The data may be programmed during an electronic die sort (EDS) test operation, and the data program operation will be described in detail below with reference to FIG. 12.

The storage element 90 may be non-volatile memory such as, for example, flash memory, parameter random access memory (PRAM), and magnetic random access memory (MRAM), or one-time programmed memory. In a semiconductor chip, a region where the storage element 90 is formed may be protected from unauthorized read commands.

Figure 12:
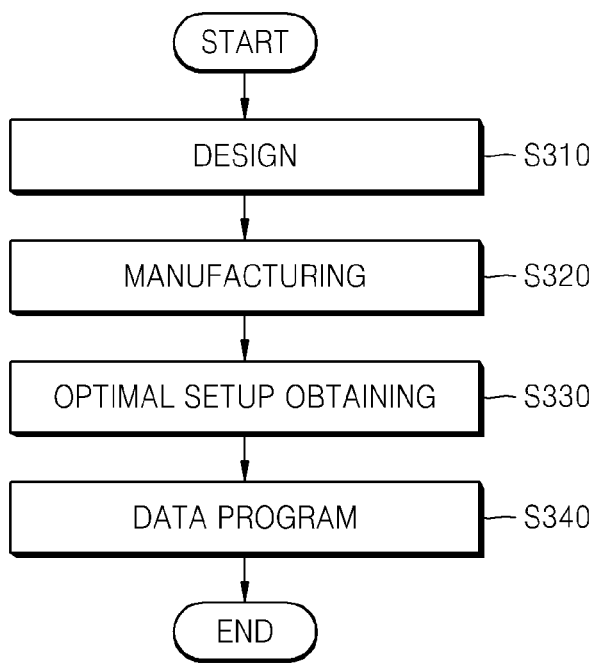
FIG. 12 is a flowchart of an embodiment of a method of manufacturing the random number generating apparatus illustrated in FIG. 11.

FIG. 12 is a flowchart of an embodiment of a method of manufacturing the random number generating apparatus 100d illustrated in FIG. 11.

Referring to FIGS. 11 and 12, the method mainly includes a design operation S310, a manufacturing operation S320, an optimal setup obtaining operation S330, and a data program operation S340.

In the design operation S310, a basic random number generator and a redundant random number generator are designed. During the design operation S310, parameters of the basic and redundant random number generators may be determined, and layouts of the basic and redundant random number generators may be determined by performing a simulation.

In the manufacturing operation S320, the random number generators are formed on a wafer based on the parameters and the layouts, e.g., a silicon wafer. The random number generating apparatus 100d, including a plurality of metastable state generation units 10 and a plurality of amplification units 20 are formed on the wafer by performing deposition and etching processes, is manufactured.

In the optimal setup obtaining operation S330, a connection commutation having excellent-level entropy is obtained. For example, the optimal setup obtaining operation S330 may be performed while an EDS test is performed on the wafer on which the random number generating apparatus 100d is formed. In more detail, during the (extended) EDS test operation, one or more entropies corresponding to connection commutations of one or more metastable state generation units 10 and one or more amplification units 20 are estimated, and a connection commutation having maximum entropy or having entropy greater than a threshold value from among the entropies may be obtained as an optimal setup.

In the data program operation S340, data used to generate a connection signal corresponding to the connection commutation obtained as the optimal setup is programmed in the storage element 90. For example, during the optimal setup obtaining operation S330 (i.e., the extended EDS test operation), as described above in relation to FIG. 2, a connection commutation for connecting the first metastable state generation unit 11 to the second amplification unit 22 may be obtained as the optimal setup. In this case, during the data program operation S340, first data for connecting the first metastable state generation unit 11 to the second amplification unit 22 and second data for connecting the second amplification unit 22 to the sampling unit 30 may be programmed in the storage element 90.

If the random number generating apparatus 100d is turned on, the connection signal generation unit 60 may generate the first and second connection signals CON1 and CON2 based on the first and second data stored (programmed) in the storage element 90. Accordingly, the random number generating apparatus 100d may operate as a random number generating apparatus having maximum entropy or having entropy greater than a threshold value.

Figure 13:
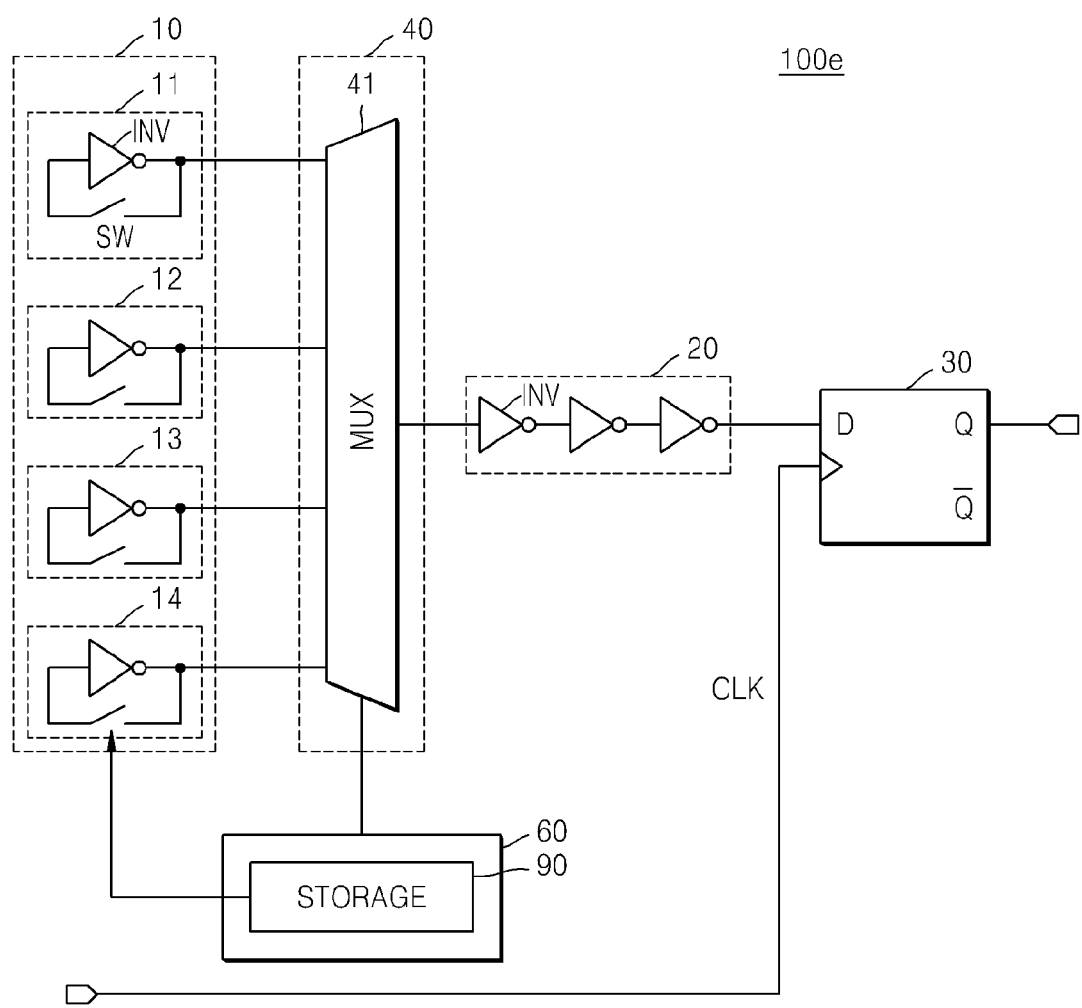
FIG. 13 is a circuit diagram of another embodiment of an apparatus configured to generate a random number, according to aspects of the inventive concept.

FIG. 13 is a circuit diagram of another embodiment of an apparatus 100e configured to generate a random number according to aspects of the inventive concept. The random number generating apparatus 100e illustrated in FIG. 13 may be considered to be a partially modified form of the random number generating apparatus 100d illustrated in FIG. 11. Thus, repeated descriptions therebetween are not provided here.

Referring to FIG. 13, the first commutation unit 40 may include a multiplexer 41 connected to a plurality of metastable state generation units 10. The multiplexer 41 may transmit a metastable state signal generated by one of the metastable state generation units 10 to the amplification unit 20 according to the first connection signal CON1. Since only one amplification unit 20 is included in the random number generating apparatus 100e, the second commutation unit 50 illustrated in the embodiments of FIGS. 1, 4, 10, and 11 is not required in this embodiment.

The storage element 90 included in the connection signal generation unit 60 may generate an operation signal of the metastable state generation units 10 and the first connection signal CON1 based on programmed data. For example, if it is determined in an extended EDS test that a connection commutation of the second metastable state generation unit 12 and the amplification unit 20 has maximum entropy or has entropy greater than a threshold value, the storage element 90 may store data for connecting the second metastable state generation unit 12 to the amplification unit 20.

While the random number generating apparatus 100e operates, the storage element 90 may generate an operation signal used to turn on the second metastable state generation unit 12 and the first connection signal CON1 used to connect the second metastable state generation unit 12 to the amplification unit 20 based on the data. Accordingly, the second metastable state generation unit 12 may be connected to the amplification unit 20 and thus an excellent-quality random number may be generated.

Figure 14:
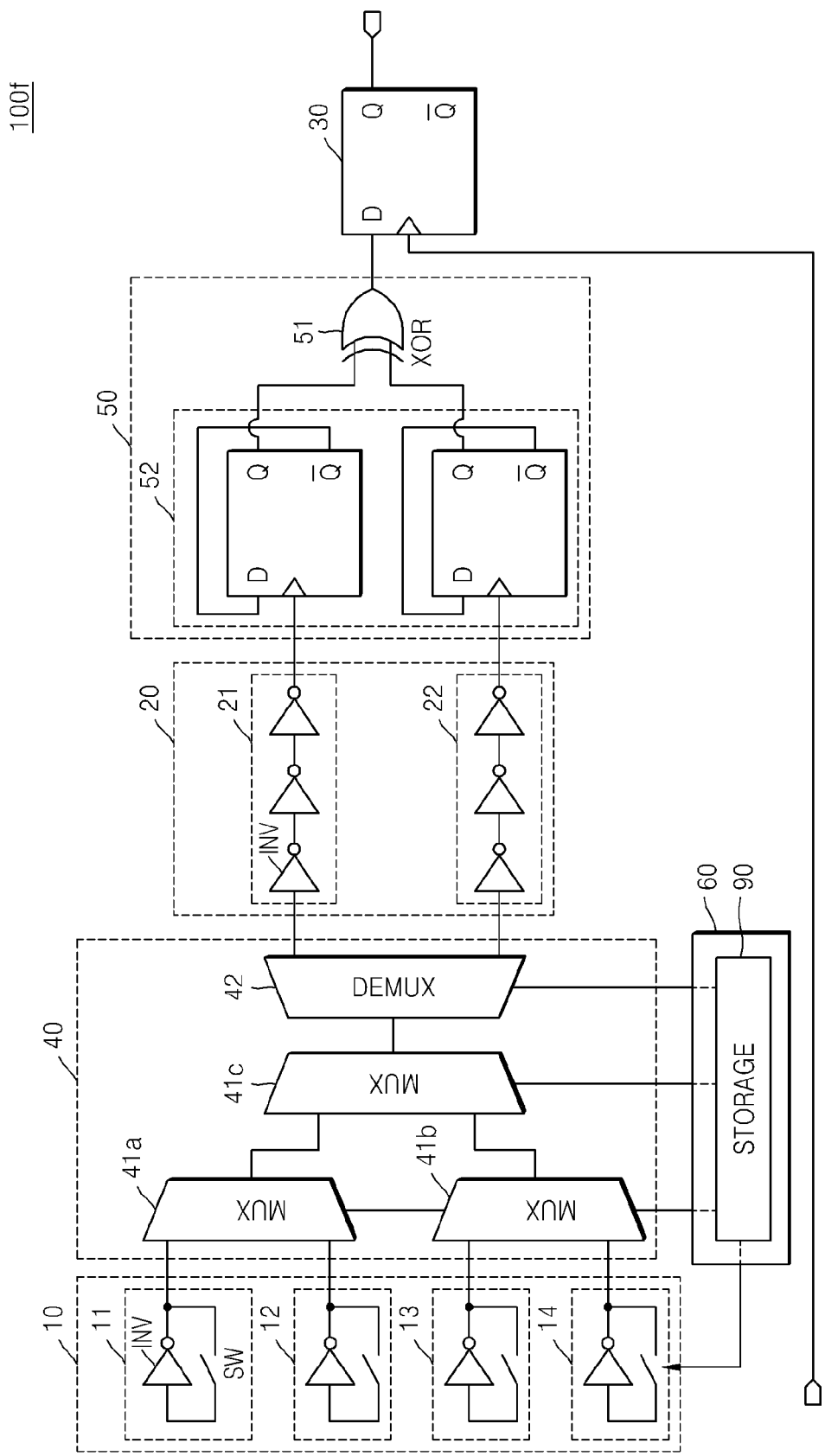
FIGS. 14 and 15 are circuit diagrams of other embodiments apparatuses configured to generate a random number, according to aspects of the inventive concept.
Figure 15:
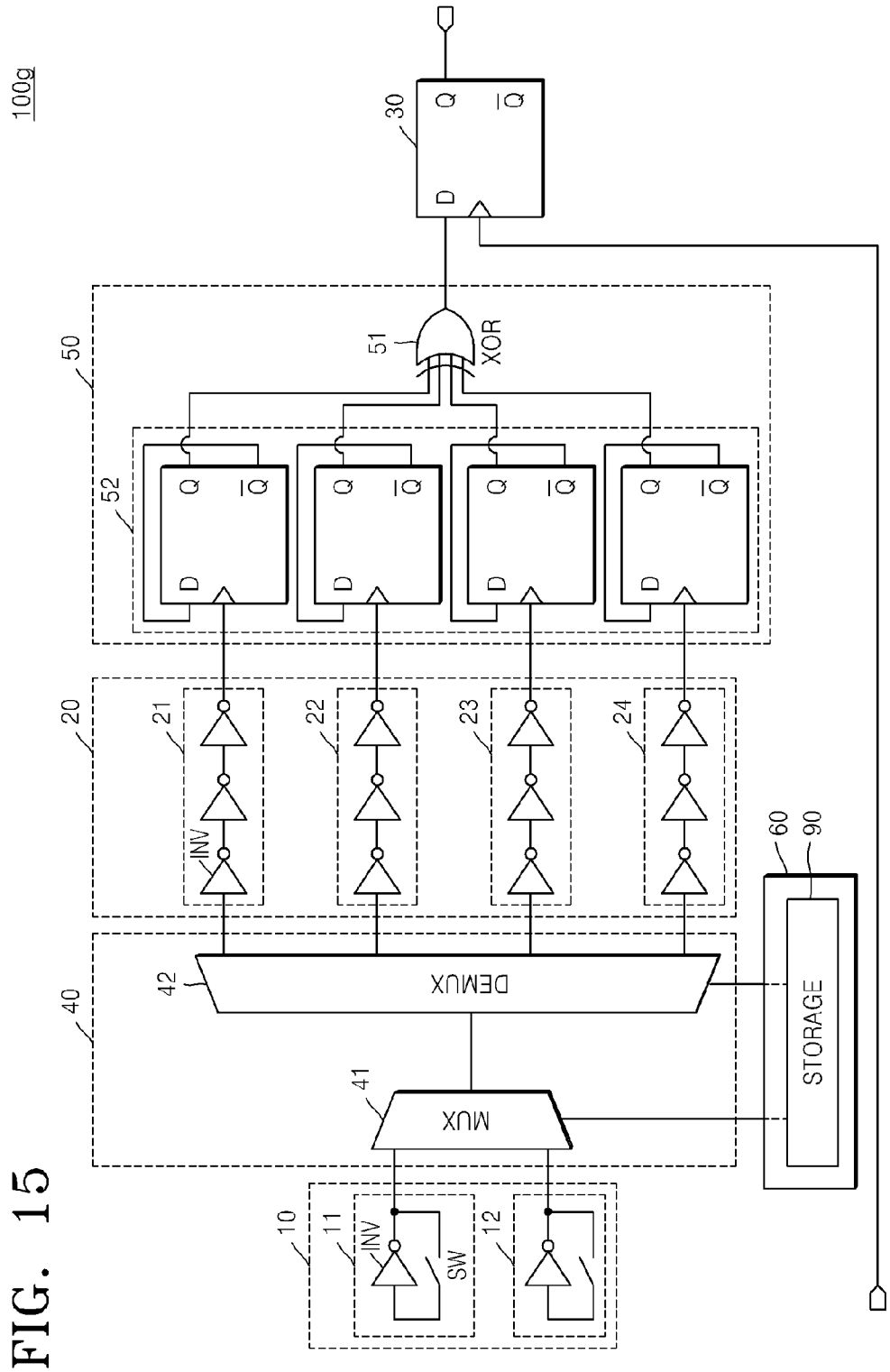

FIGS. 14 and 15 are circuit diagrams of embodiments of apparatuses 100f and 100g configured to generate a random number according to other aspects of the inventive concept. The random number generating apparatuses 100f and 100g illustrated in FIGS. 14 and 15 may be considered to be partially modified forms of the random number generating apparatus 100d illustrated in FIG. 11. Thus, repeated descriptions therebetween are not provided here.

Referring to FIG. 14, the random number generating apparatus 100f may include first and second multiplexers 41a and 41b connected to a plurality of metastable state generation units 10, and a demultiplexer 42 connected to a plurality of amplification units 20. Also, the random number generating apparatus 100f may further include a third multiplexer 41c connected between the first and second multiplexers 41a and 41b and the demultiplexer 42. The first through third multiplexers 41a through 41c and the demultiplexer 42 may operate in response to receipt of the first connection signal CON1.

For example, if the random number generating apparatus 100f includes four metastable state generation units 10 and two amplification units 20, the first connection signal CON1 may include first through third bit signals. The first multiplexer 41a may receive the first bit signal, and the second multiplexer 41b may receive an inverted signal of the first bit signal. Also, the third multiplexer 41c may receive the second bit signal, and the demultiplexer 42 may receive the third bit signal.

If it is determined in an extended EDS test that a connection commutation of the second metastable state generation unit 12 and the first amplification unit 21 has maximum entropy or has entropy greater than a threshold value, data stored in the storage element 90 may be '100'. In this case, the connection signal generation unit 60 may generate an operation signal used to turn on the second metastable state generation unit 12. Also, the connection signal generation unit 60 may generate the first connection signal CON1 in which the first bit signal is '1', the second bit signal is '0', and the third bit signal is '0'.

In this case, the first bit signal '1' is applied to the first multiplexer 41a. Accordingly, the first multiplexer 41a may transmit a metastable state signal output from the second metastable state generation unit 12, to the third multiplexer 41c. Also, the second bit signal '0' is applied to the third multiplexer 41c. Accordingly, the third multiplexer 41c may transmit the metastable state signal to the demultiplexer 42. Meanwhile, since the third bit signal is '0', the metastable state signal is transmitted to the first amplification unit 21. Accordingly, an excellent-quality random number may be generated by the second metastable state generation unit 12 and the first amplification unit 21.

In the embodiments of FIGS. 14 and 15, the second commutation units 50 have unique structures. In each case, the second commutation unit 50 may be connected to the amplification units 20, and may be configured to generate a random signal from an amplified metastable state signal. For this, the second commutation unit 50 may include an XOR gate 51 and a mod 2 counter 52.

The mod 2 counter 52 may be connected between the amplification units 20 and the XOR gate 51. With the mod 2 counter 52 connected to each of the amplification units 20, the mod 2 counter may count the number of rising edges (i.e., the number of transitions from a low state to a high state) in an amplified metastable state signal of each of the amplification units 20. For example, the mod 2 counter 52 may output a value 1 if the number of the rising edges is an odd number, and may output a value 0 if the number of the rising edges is an even number. However, the current embodiment is not limited thereto and the mod 2 counter 52 may be configured to count the number of falling edges or the number of rising and falling edges. Also, the mod 2 counter 52 may be substituted by any other counter for performing a counting function.

The XOR gate 51 may perform XOR calculation on signals output from a plurality of mod 2 counters 52 and may output a calculation resultant signal. The sampling unit 30 may sample and output the output signal of the XOR gate 51 in response to a sampling clock. For example, if the sampling clock applied to the sampling unit 30 has a cycle of 1 µs, the sampling unit 30 may store and output the state (i.e., a high or low state) of the output signal of the XOR gate 51 in every 1 µs.

Figure 16:
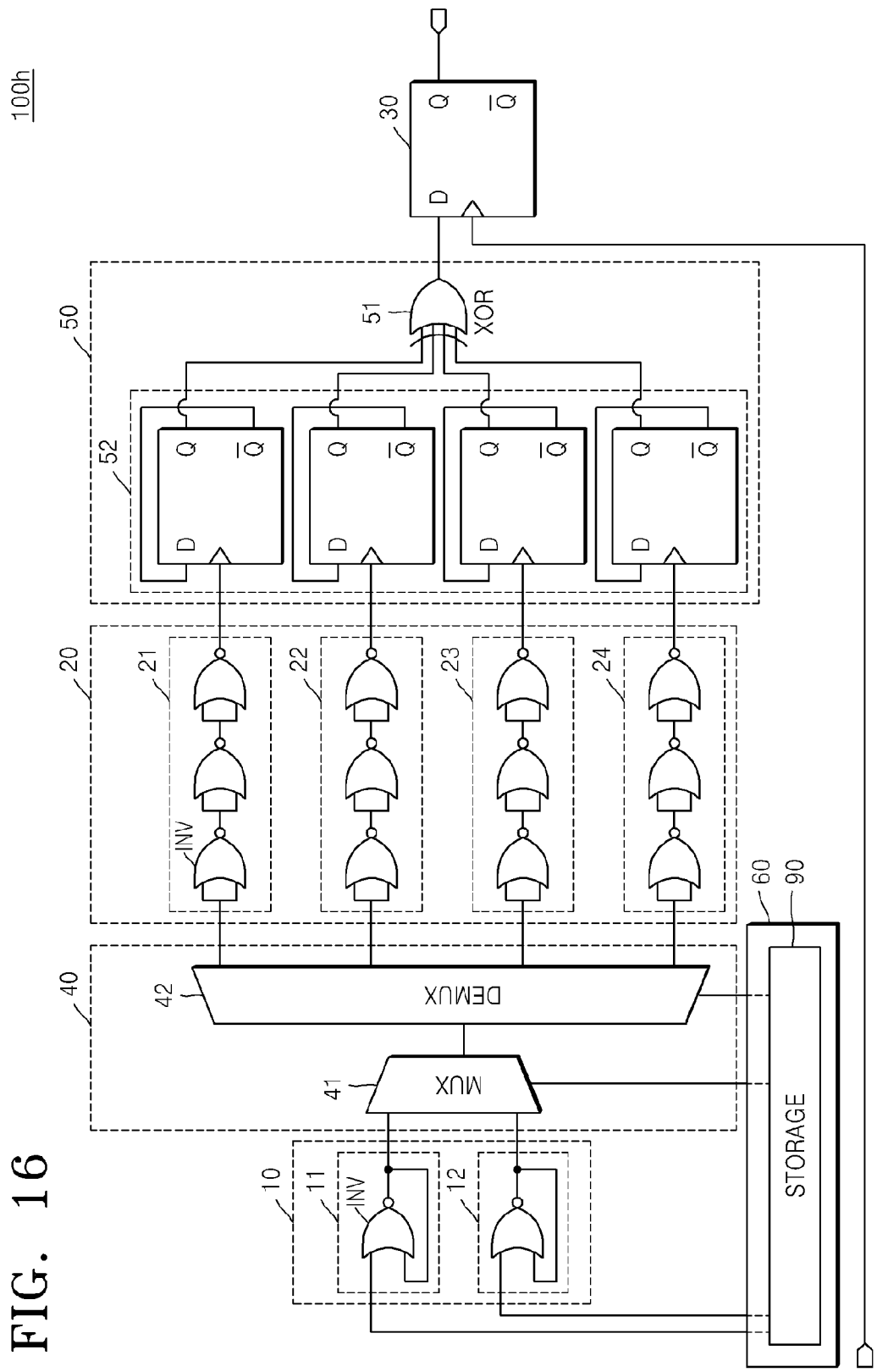
FIGS. 16 and 17 are circuit diagrams of other embodiments of apparatuses configured to generate a random number, according to aspects of the inventive concept.
Figure 17:
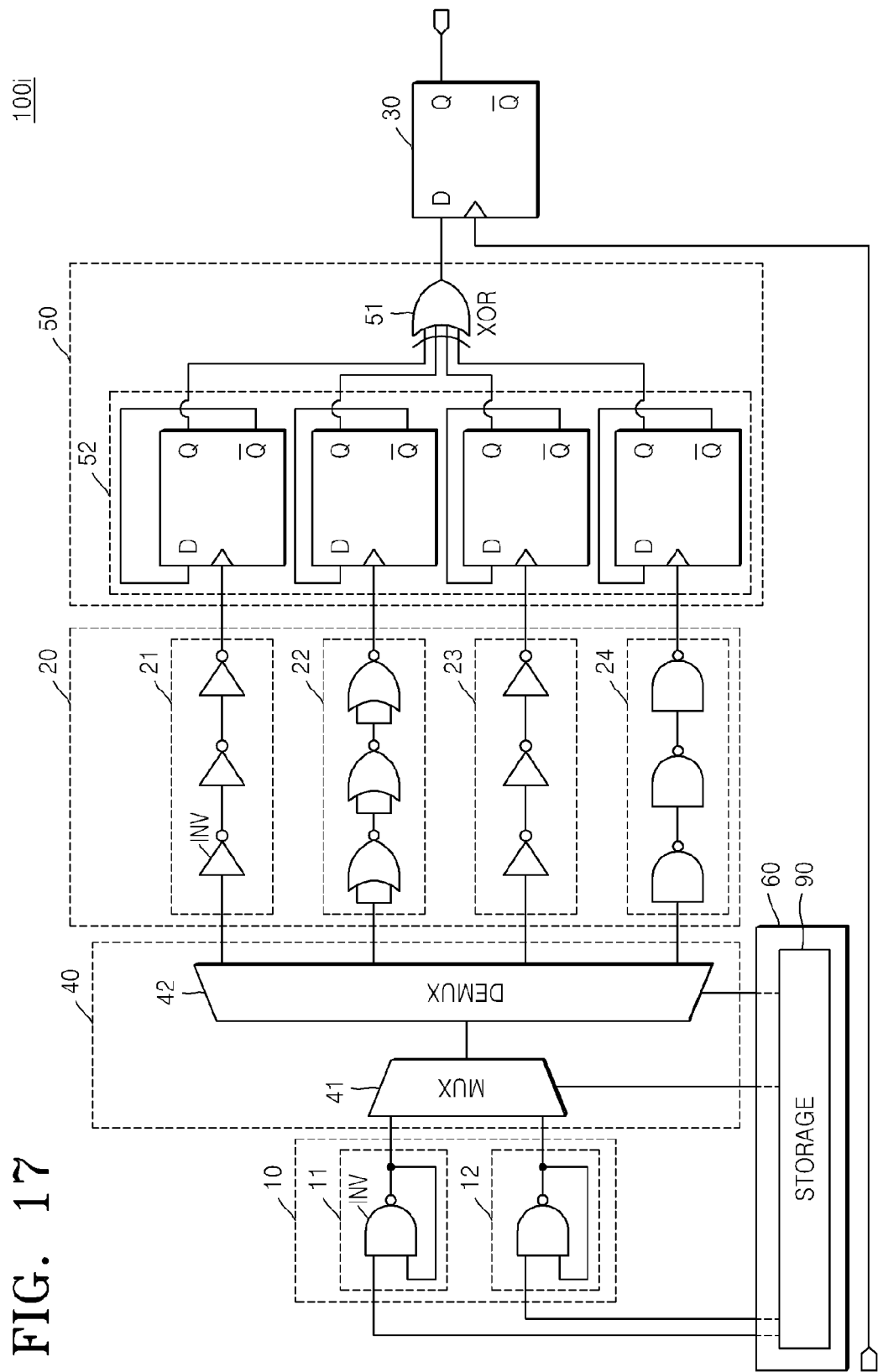

FIGS. 16 and 17 are circuit diagrams of other embodiments of apparatuses 100h and 100i for generating a random number, according to aspects of the inventive concept. The random number generating apparatuses 100h and 100i illustrated in FIGS. 16 and 17 may be considered to be partially modified forms of the random number generating apparatus 100g illustrated in FIG. 15. Thus, repeated descriptions therebetween are not provided here.

In the embodiments of FIGS. 16 and 17, the inversion units INV have a unique structure. The inversion units INV included in the metastable state generation units 10 and the amplification units 20 may be inverters, as in previous embodiments. However, the current embodiment is not limited thereto. That is, as illustrated in FIG. 16, the inversion units INV may be NOR gates instead of inverters, such as those illustrated in FIG. 1.

Therefore, in various embodiments, each of the inversion units INV of the metastable state generation units 10 may be a NOR gate. In this case, an operation signal may be input to a first input terminal of the NOR gate, and a second input terminal of the NOR gate may be connected to an output terminal of the NOR gate. Also, in various embodiments, each of the inversion units INV of the amplification units 20 may be a NOR gate. In this case, first and second input terminals of the NOR gate may be connected to each other.

In the embodiment of FIG. 17, the inversion units INV of the metastable state generation units 10 are NAND gates, and the inversion units INV of the amplification units 20 can be inverters, NOR gates, and NAND gates, as shown.

Therefore, in various embodiments, each of the inversion units INV of the metastable state generation units 10 may be a NAND gate. In this case, an operation signal may be input to a first input terminal of the NAND gate, a second input terminal of the NAND gate may be connected to an output terminal of the NAND gate. Also, in various embodiments, each of the inversion units INV of the amplification units 20 may be one or more of an inverter, a NOR gate, or a NAND gate, including combinations thereof. In this case, first and second input terminals of the NAND gate may be connected to each other.

Figure 18:
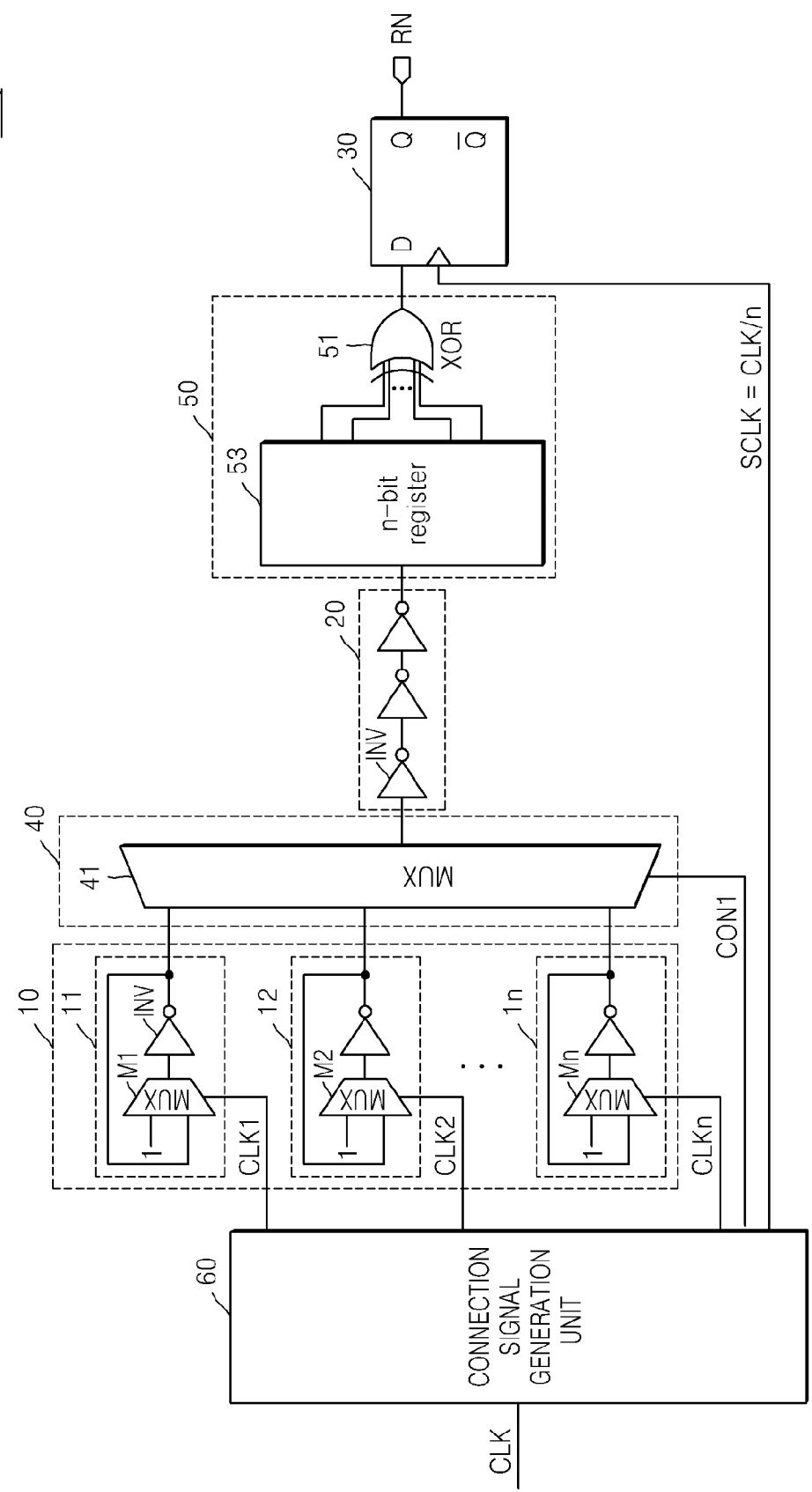
FIG. 18 is a circuit diagram of another embodiment of an apparatus configured to generate a random number, according to aspects of the inventive concept.

FIG. 18 is a circuit diagram of another embodiment of an apparatus 100j configured to generate a random number according to aspects of the inventive concept. The random number generating apparatus 100j illustrated in FIG. 18 may be considered to be a partially modified form of the random number generating apparatus 100c illustrated in FIG. 10. Thus, repeated descriptions therebetween are not provided here.

Referring to FIG. 18, the connection signal generation unit 60 may generate an operation signal of the metastable state generation units 10 and the first connection signal CON1 based on first through nth clock signals CLK1 through CLKn. Also, if the number of the metastable state generation units 10 is n, the random number generating apparatus 100j may further include an n-bit register 53 and an XOR gate 51.

The connection signal generation unit 60 may generate the first through $n^{th}$ clock signals CLK1 through CLKn. Since output and input terminals of each of the metastable state generation units 10 are connected to each other according to the first through $n^{th}$ clock signals CLK1 through CLKn, a metastable state signal may be generated. The metastable state signal may be transmitted to the amplification unit 20 according to the first connection signal CON1, and an amplified metastable state signal may be stored in the n-bit register 53. Data stored in the n-bit register 53 is XOR-calculated and is stored in the sampling unit 30 as a random signal. Thus, a random signal stored in the sampling unit 30 may be output according to a sampling clock signal SCLK.

Although only one amplification unit 20 is illustrated in FIG. 18, the current embodiment is not limited thereto. In order to generate an excellent-quality random number having high entropy, the random number generating apparatus 100*j* may include a plurality of amplification units 20, and at least one amplification unit 20 may be selected according to a second connection signal.

Figure 19:
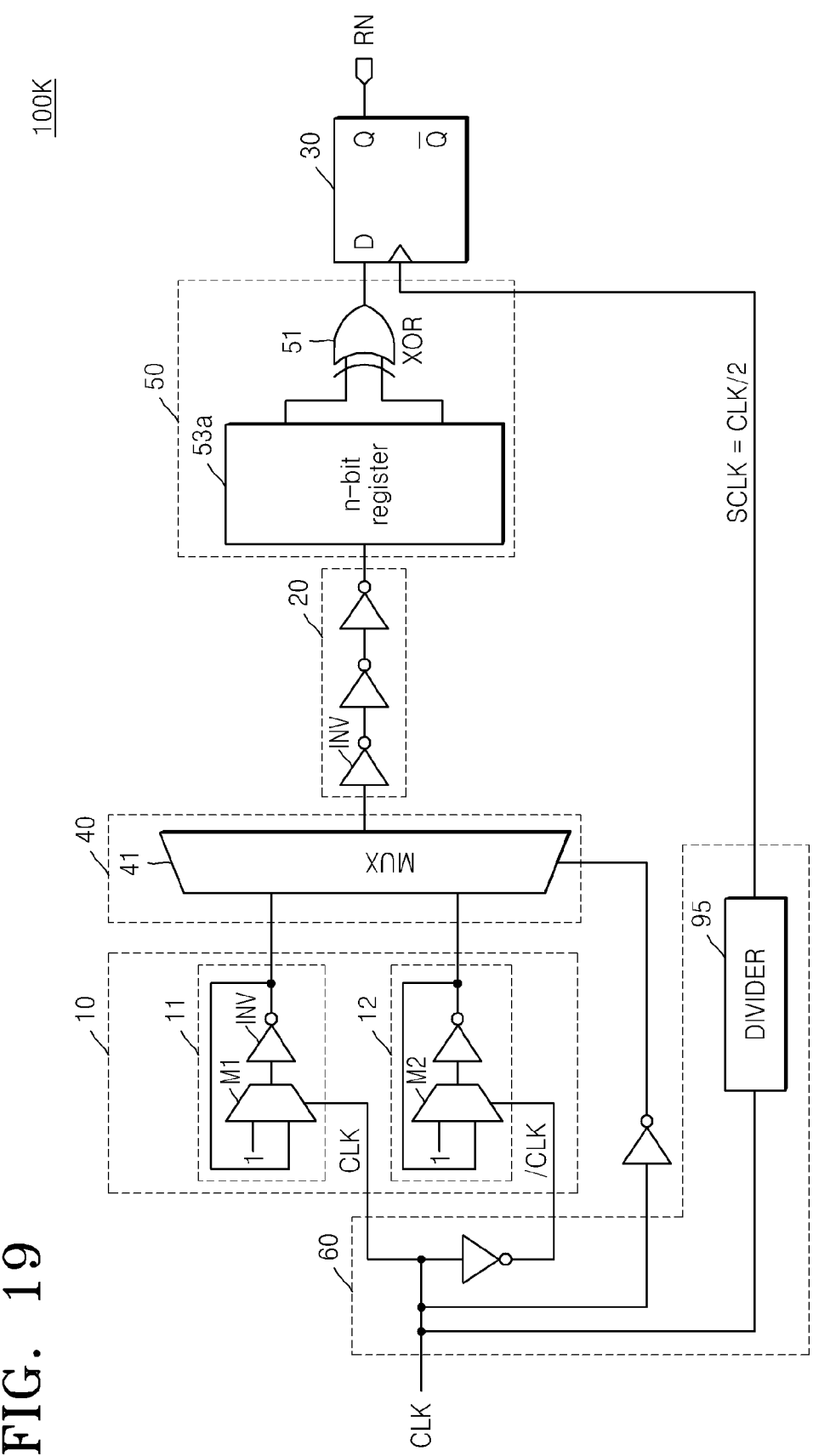
FIG. 19 is a circuit diagram of another embodiment of an apparatus configured to generate a random number, according to aspects of the inventive concept.

FIG. 19 is a detailed circuit diagram of an example embodiment of the random number generating apparatus 100*j* illustrated in FIG. 18. The example embodiment of the random number generating apparatus 100*j* is referred to as an apparatus 100k in FIG. 19.

Referring to FIG. 19, the connection signal generation unit 60 may apply a clock signal CLK to a first multiplexer M1 as an operation signal of the first multiplexer M1, and may apply a clock bar signal /CLK to a second multiplexer M2 as an operation signal of the second multiplexer M2. Also, the connection signal generation unit 60 may apply the clock bar signal /CLK to multiplexer 41 of the first commutation unit 40 as the first connection signal CON1.

Operation of the random number generating apparatus 100*k* is as described below. If the clock signal CLK is in a high state, the first metastable state generation unit 11 operates due to the first multiplexer M1, and the first commutation unit 40 transmits a first metastable state signal generated by the first metastable state generation unit 11 to the amplification unit 20. An amplified first metastable state signal is stored in a 2-bit register 53*a*.

If the clock signal CLK is in a low state, the second metastable state generation unit 12 operates due to the second multiplexer M2, and the first commutation unit 40 transmits a second metastable state signal generated by the second metastable state generation unit 12 to the amplification unit 20. An amplified second metastable state signal is stored in the 2-bit register 53*a*.

The XOR gate 51 performs XOR calculation on the first and second metastable state signals and outputs a random signal RN. The random signal RN is applied to the sampling unit 30 and the sampling unit 30 stores the applied random signal RN.

If the clock signal CLK transitions to a high state, the sampling clock signal SCLK delayed by a divider 95 transitions from a low state to a high state. If the sampling clock signal SCLK transitioned to a high state is applied to the sampling unit 30, the sampling unit 30 outputs the stored random signal RN.

In the random number generating apparatus 100*k*, the above-described operations are repeated according to the transition of the clock signal CLK. Accordingly, an excellent-quality random number generated by using both of the first and second metastable state generation units 11 and 12 may be obtained.

Figure 20:
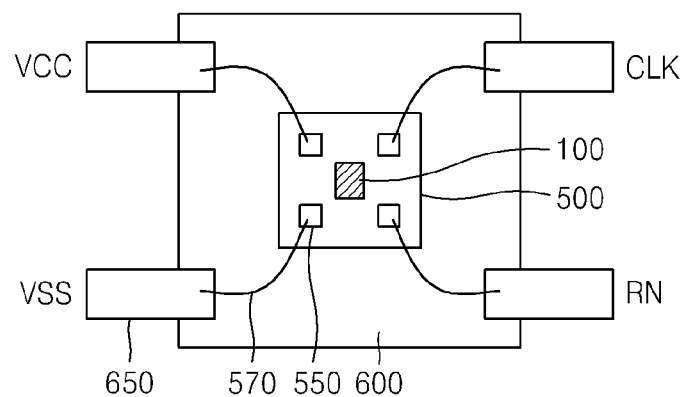
FIG. 20 is a plan view of an embodiment of a semiconductor package including an apparatus configured to generate a random number, according to aspects of the inventive concept.

FIG. 20 is a plan view of an embodiment of a semiconductor package including an apparatus 100 for generating a random number, according to aspects of the inventive concept. The random number generating apparatus 100 included in the semiconductor package illustrated in FIG. 20 may be, for example, any one of the random number generating apparatuses 100a through 100k illustrated in FIGS. 1, 4, 10, 11, and 13 through 19.

Referring to FIG. 20, the random number generating apparatus 100 may be formed on a semiconductor chip 500, and the semiconductor chip 500 may be mounted on a printed circuit board (PCB) 600. A chip pad 550 of the semiconductor chip 500 may be electrically connected to external terminals 650 of the PCB 600 via bonding wires 570. Accordingly, a first voltage VCC, a second voltage VSS, and the clock signal CLK applied from the external terminals 650 may be applied to the semiconductor chip 500 via the bonding wires 570. The random signal RN generated by the random number generating apparatus 100 may be output to the external terminals 650 via the chip pad 550 and the bonding wires 570. The packaging method illustrated in FIG. 20 is merely an exemplary method, and various semiconductor packages may be formed by using any other packaging method to include the random number generating apparatus 100.

Figure 21:
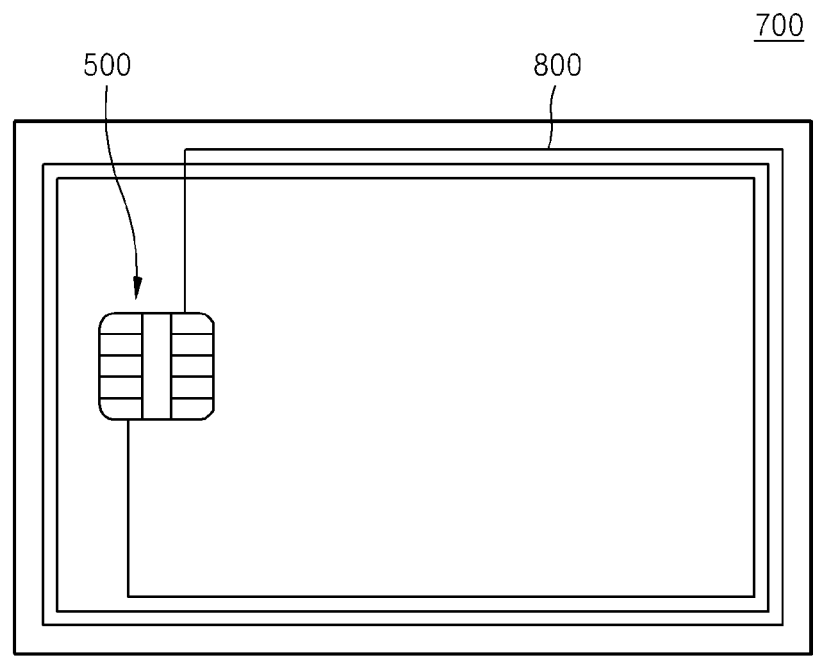
FIG. 21 is a plan view of an embodiment of a smart card including an apparatus configured to generate a random number, according to aspects of the inventive concept.

FIG. 21 is a plan view of an embodiment of a smart card 700 including an apparatus for generating a random number according to aspects of the inventive concept. The random number generating apparatus included in the smart card 700 illustrated in FIG. 21 may be, for example, any one of the random number generating apparatuses 100a through 100k illustrated in FIGS. 1, 4, 10, 11, and 13 through 19.

Since the smart card 700 basically authenticates (i.e., identifies) a card owner, authentication between a card reader (not shown) and the smart card 700 is required. The authentication may be performed, for example, by allowing the card reader to receive and check authentication information stored in the smart card 700. In this case, since the authentication information has to be secured, an appropriate algorithm for encrypting the authentication information and the random number generating apparatus for executing the algorithm are required.

The semiconductor chip 500 may include the random number generating apparatus in order to perform the authentication function.

An antenna 800 receives and transmits power supplied from the card reader to the semiconductor chip 500, or transmits the authentication information encrypted by the semiconductor chip 500.

Figure 22:
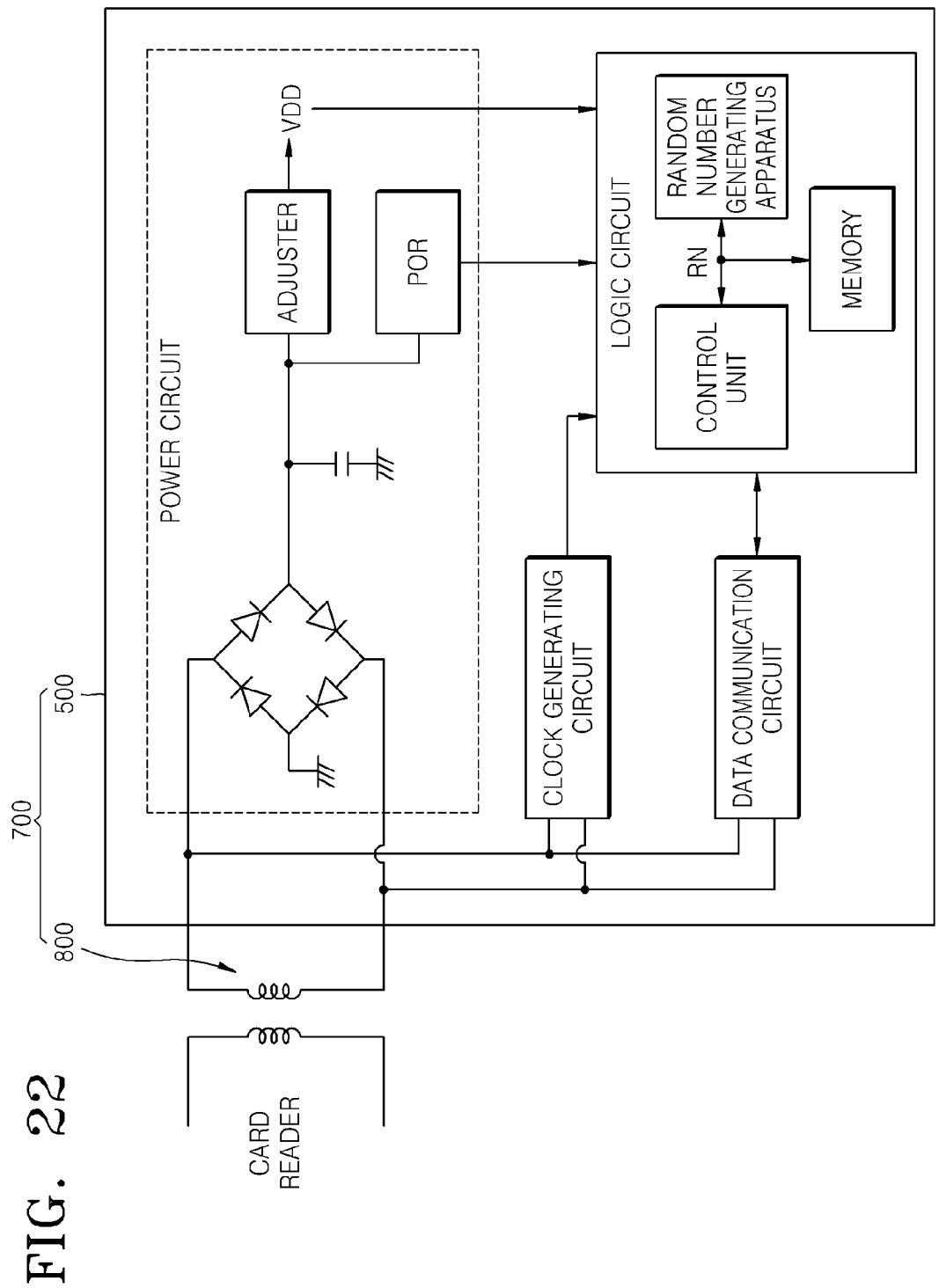
FIG. 22 is a circuit diagram of an embodiment of a semiconductor chip of the smart card illustrated in FIG. 21, according to aspects of the inventive concept.

FIG. 22 is a detailed circuit diagram of an embodiment of the semiconductor chip 500 of the smart card 700 illustrated in FIG. 21.

Referring to FIG. 22, the semiconductor chip 500 may include a power circuit, a clock generating circuit, a logic circuit, and a data communication circuit.

The power circuit may generate a direct current (DC) voltage based on an alternating current (AC) signal received from the antenna 800. Also, the power circuit may include may include a power-on reset circuit for resetting previously stored data if power is supplied, as would be appreciated by one skilled in the art.

The clock generating circuit may convert the AC signal received from the antenna 800 into the clock signal CLK and may apply the clock signal CLK to the logic circuit, as would be appreciated by one skilled in the art.

The logic circuit may include a control unit, a memory, and a random number generating apparatus according to aspects of the inventive concept. The random number generating apparatus can be configured to generate the random signal RN, as described above. The structure of the random number generating apparatus can be as described in the previous embodiments, and thus detailed descriptions thereof is not provided here. The control unit may be configured to encrypt authentication information based on the random signal RN generated by the random number generating apparatus. The memory stores the authentication information, the random signal RN, and the encrypted authentication information.

The data communication circuit processes and transmits information received from the card reader and the antenna 800 to the logic circuit, or processes and transmits the authentication information encrypted by the logic circuit to the antenna 800 and the card reader.

While embodiments in accordance with the inventive concept have been particularly shown and described with reference to exemplary drawings, it will be understood that various changes in form and details may be made therein without departing from the spirit and scope of the inventive concept. The inventive concept and scope thereof is to be determined from the following claims, and not from explicit embodiments depicted and/or described herein.

What is claimed is:

1. A random number generating apparatus, the apparatus comprising:
   a plurality of metastable state generation units configured to generate a metastable state signal;
   a plurality of amplification units configured to amplify the metastable state signal;
   a connection signal generation unit configured to generate a first connection signal; and
   a first commutation unit configured to connect at least one metastable state generation unit to at least one amplification unit according to the first connection signal,
   wherein the first commutation unit is configured to connect a metastable generation unit to a different one of the plurality of amplification units based on the first connection signal.

2. The apparatus of claim 1, wherein the first commutation unit comprises a plurality of switches, each switch configured to provide a connection commutation between at least one metastable state generation unit and at least one amplification unit.

3. The apparatus of claim 2, wherein, if the number of the plurality of metastable state generation units is m and the number of the plurality of amplification units is n, the plurality of switches are configured to provide m×n connection commutations.

4. The apparatus of claim 1, wherein the first commutation unit comprises:
   at least one multiplexer connected to the plurality of metastable state generation units and configured to transmit the metastable state signal; and
   at least one demultiplexer connected between the multiplexer and the plurality of amplification units and configured to transmit the metastable state signal,
   wherein the multiplexer and the demultiplexer operate in response to the first connection signal.

5. The apparatus of claim 1, further comprising an entropy estimator configured to estimate entropy of the amplified metastable state signal.

6. The apparatus of claim 5, wherein the entropy estimator is configured to estimate the entropy of the amplified metastable state signal using at least one of a bias test method and a chi-squared test method.

7. The apparatus of claim 1, wherein the connection signal generation unit comprises a storage element configured to store data used to generate the first connection signal.

8. The apparatus of claim 7, wherein, during an electronic die sort (EDS) test on the apparatus, one or more entropies corresponding to connection commutations of one or more of the metastable state generation units and one or more of the amplification units are estimated, and
   wherein the data is programmed in the storage to generate a connection signal corresponding to a connection commutation having maximum entropy or having entropy greater than the threshold value from among the one or more entropies.

9. The apparatus of claim 1, further comprising:
   a second commutation unit connected to the plurality of amplification units and configured to generate a random signal from the amplified metastable state signal.

10. The apparatus of claim 9, wherein the second commutation unit comprises an XOR gate.

11. A random number generating apparatus, comprising:
    a plurality of metastable state generation units configured to generate a metastable state signal;
    a plurality of amplification units configured to amplify the metastable state signal;
    a sampling unit for storing the amplified metastable state signal and outputting the amplified metastable state signal in response to a clock signal;
    a first commutation unit configured to connect at least one metastable state generation unit to at least one amplification unit according to a first connection signal;
    a second commutation unit configured to connect the at least one amplification unit to the sampling unit according to a second connection signal; and
    a connection signal generation unit configured to generate the first and second connection signals.

12. The apparatus of claim 11, wherein the first commutation unit is configured to connect a metastable generation unit to a different one of the plurality of amplification units based on the first connection signal.

13. A method of generating random numbers, the method comprising:
    generating a metastable state signal from a plurality of metastable state generation units;
    generating a first connection signal from a connection signal generation unit; and
    selectively connecting, using a first commutation unit, at least one of the metastable state generation units to at least one amplification unit from a plurality of amplification units based on the first connection signal,
    wherein the first commutation unit is configured to connect a metastable generation unit to a different one of the plurality of amplification units based on the first connection signal.

14. The method of claim 13, further comprising:
    generating a random signal from the amplified metastable state signal by a second commutation unit connected to the plurality of amplification units.

* * * * *